(12) United States Patent
Lebioda et al.

(10) Patent No.: US 12,551,484 B2
(45) Date of Patent: Feb. 17, 2026

(54) METHODS OF TREATMENT AND/OR PREVENTION OF MAJOR ADVERSE CARDIOVASCULAR EVENTS (MACE) WITH A COMBINATION OF A BET BROMODOMAIN INHIBITOR AND A SODIUM DEPENDENT GLUCOSE TRANSPORT 2 INHIBITOR

(71) Applicant: Resverlogix Corp., Calgary (CA)

(72) Inventors: Kenneth Eugene Lebioda, Calgary (CA); Christopher Ross Armstrong Halliday, Calgary (CA); Aziz Naeem Khan, Calgary (CA)

(73) Assignee: Resverlogix Corp., Calgary (CA)

( * ) Notice: Subject to any disclaimer, the term of this patent is extended or adjusted under 35 U.S.C. 154(b) by 876 days.

(21) Appl. No.: 17/774,657

(22) PCT Filed: Nov. 4, 2020

(86) PCT No.: PCT/IB2020/000912
§ 371 (c)(1),
(2) Date: May 5, 2022

(87) PCT Pub. No.: WO2021/090061
PCT Pub. Date: May 14, 2021

(65) Prior Publication Data
US 2022/0370452 A1  Nov. 24, 2022

Related U.S. Application Data

(60) Provisional application No. 62/930,860, filed on Nov. 5, 2019.

(51) Int. Cl.
*A61K 31/517* (2006.01)
*A61K 45/06* (2006.01)
*A61P 9/04* (2006.01)

(52) U.S. Cl.
CPC ............ *A61K 31/517* (2013.01); *A61K 45/06* (2013.01); *A61P 9/04* (2018.01)

(58) Field of Classification Search
CPC .................................................. A61K 31/517
See application file for complete search history.

(56) References Cited

U.S. PATENT DOCUMENTS

| | | | |
|---|---|---|---|
| 8,053,440 B2 | 11/2011 | Hansen | |
| 8,410,109 B2 | 4/2013 | Wong et al. | |
| 8,889,698 B2 | 11/2014 | Hansen | |
| 9,199,990 B2 | 12/2015 | Hansen | |
| 9,238,640 B2 | 1/2016 | Hansen | |
| 9,610,251 B2 | 4/2017 | Shenoy | |
| 9,757,368 B2 | 9/2017 | Hansen | |
| 9,765,039 B2 | 9/2017 | Fairfax et al. | |
| 10,111,885 B2 | 10/2018 | Kulikowski et al. | |
| 10,131,640 B2 | 11/2018 | Hansen | |
| 10,532,054 B2 | 1/2020 | Hansen | |
| 10,752,595 B2 | 8/2020 | Chen et al. | |
| 10,772,894 B2 | 9/2020 | Kulikowski et al. | |
| 10,882,828 B2 | 1/2021 | Hansen | |
| 11,407,719 B2 | 8/2022 | Hansen | |
| 11,419,883 B2 | 8/2022 | Bhushan | |
| 2016/0106750 A1 | 4/2016 | Hansen | |
| 2016/0206617 A1 | 7/2016 | Lebioda et al. | |
| 2016/0346291 A1 | 12/2016 | Lebioda | |

(Continued)

FOREIGN PATENT DOCUMENTS

| WO | WO 2007/016525 A2 | 2/2007 |
|---|---|---|
| WO | WO 2008/092231 A1 | 8/2008 |

(Continued)

OTHER PUBLICATIONS

Hsu et al. "Major adverse cardiovascular events' reduction and their association with glucose-lowering medications and glycemic control among patients with type 2 diabetes: A retrospective cohort study using electronic health records." Journal of diabetes vol. 16,10 (2024): doi:10.1111/1753-0407.13604 (Year: 2024).*
Badimon, J. J. et al., "Regression of Atherosclerotic Lesions by High Density Lipoprotein Plasma Fraction in the Cholesterol-fed Rabbit," J. Clin. Invest., vol. 85, Apr. 1990, pp. 1234-1241, © The American Society for Clinical Investigation, Inc., 8 pgs.
Berliner, J. A. et al., "Atherosclerosis: Basic Mechanisms Oxidation, Inflammation, and Genetics," Circulation, 1995; 91:2488-2496, © 1995 by American Heart Association, 20 pgs.
Cannon, C. P. et al. (2015) Ezetimibe Added to Statin Therapy after Acute Coronary Syndromes. N Engl J Med, 372(25), 2387-97.
Carbone S. et al. (2019) The CANVAS Program: implications of canaglifozin on reducing cardiovascular risk in patients with type 2 diabetes mellitus. Cardiovasc Diabetol, 18(64), 1-13.

(Continued)

*Primary Examiner* — Andrew D Kosar
*Assistant Examiner* — Connor K English
(74) *Attorney, Agent, or Firm* — Finnegan, Henderson, Farabow, Garrett & Dunner, LLP

(57) ABSTRACT

Described herein are methods of for treating and/or preventing Major adverse cardiovascular events (MACE). by administering to a subject in need thereof, a combination of a sodium-glucose transport protein 2 (SGLT2) inhibitor and a compound of Formula I or a stereoisomer, tautomer, pharmaceutically acceptable salt, or hydrate thereof, wherein the variables of Formula I are as defined herein.

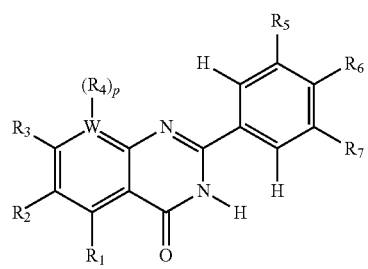

Formula I

22 Claims, 18 Drawing Sheets

(56) References Cited

U.S. PATENT DOCUMENTS

| | | | |
|---|---|---|---|
| 2017/0326143 | A1 | 11/2017 | Hansen et al. |
| 2017/0333419 | A1 | 11/2017 | Hansen et al. |
| 2020/0129512 | A1 | 4/2020 | Hansen et al. |
| 2020/0352946 | A1 | 11/2020 | Hansen |
| 2021/0361656 | A1 | 11/2021 | Hansen |
| 2022/0370452 | A1 | 11/2022 | Lebioda et al. |
| 2023/0241064 | A1 | 8/2023 | Lebioda et al. |

FOREIGN PATENT DOCUMENTS

| | | | |
|---|---|---|---|
| WO | WO 2009/158404 | A2 | 12/2009 |
| WO | WO 2010/111665 | A1 | 9/2010 |
| WO | WO 2010/138535 | A1 | 12/2010 |
| WO | WO 2013/186612 | A1 | 12/2013 |
| WO | WO 2014/170383 | A1 | 10/2014 |
| WO | WO 2015/025226 | A2 | 2/2015 |
| WO | WO 2015/025228 | A2 | 2/2015 |
| WO | WO 2016/147053 | A1 | 9/2016 |
| WO | WO 2021/090061 | A1 | 5/2021 |
| WO | WO 2021/140418 | A1 | 7/2021 |
| WO | WO 2022/091028 | A1 | 5/2022 |
| WO | WO 2022/091029 | A1 | 5/2022 |

OTHER PUBLICATIONS

Cheng, S. W. K. et al., "Lipoprotein (a) and its Relationship to Risk Factors and Severity of Atherosclerotic Peripheral Vascular Disease," Eur J Vasc Endovasc Surg, 14:17-23 (1997), © 1997 W.B. Saunders Company Ltd., 7 pgs.

Feng, Y. et al., "Human ApoA-I Transfer Attenuates Transplant Arteriosclerosis via Enhanced Incorporation of Bone marrow-derived Endothelial Progenitor Cells," Arteriosclerosis, Thrombosis, and Vascular Biology (2008) 28:278-283, © 2008 American Heart Association, Inc., 26 pgs.

Gilham, D. et al., "Apabetalone Downregulates Fibrotic, Inflammatory and Calcific Processes in Renal Mesangial Cells and Patients with Renal Impairment," Biomedicines 2023, 11(6), 1663; https://doi.org/10.3390/biomedicines11061663.

Gilham, D. et al., "#2999 Apabetalone Reduces Cardiac Events in CKD Patients By Downregulating Fibrotic and Inflammatory Processes," Nephrology Dialysis Transplantation, vol. 38, Issue Supplement_1, Jun. 2023, gfad063c_2999, https://doi.org/10.1093/ndt/gfad063c_2999.

Guettier, J.M. "Endocrinologic and Metabolic Drugs Advisory Committee (EMDAC) Meeting, Jun. 28, 2016." U.S. Food and Drug Administration (FDA). 135 pgs.

Madaan, T. et al., "Sodium glucose CoTransporter 2 (SGLT 2) inhibitors: Current status and future perspective". European Journal of Pharmaceutical Sciences. vol. 93, Oct. 10, 2016, pp. 244-252.

Mazzone, T. et al., "Cardiovascular disease risk in type 2 diabetes mellitus: insights from mechanistic studies," Lancet (2008), vol. 371:1800-09, May 24, 2008, 10 pgs.

Miyazaki, A., et al. "Intravenous Injection of Rabbit Apolipoprotein A-I Inhibits the Progression of Atherosclerosis in Cholesterol-Fed Rabbits," Arteriosclerosis, Thrombosis, and Vascular Biology, 1995; 15:1882-1888, 13 pgs.

Neal B. et al., (2017) Canagliflozin and Cardiovascular and Renal Events in Type 2 Diabetes. N Engl J Med, 377(7), 644-657.

Nicholls, S. J. et al., "Effect of the BET Protein Inhibitor, RVX-208, on Progression of Coronary Atherosclerosis: Results of the Phase 2b, Randomized, Double-Blind, Multicenter, ASSURE Trial," Am J. Cardiovasc Drugs, © Springer International Publishing Switzerland 2015, 11 pgs. DOI 10.1007/s40256-015-0146-z.

Nissen, S. E. et al., "Effect of Recombinant ApoA-I Milano on Coronary Atherosclerosis in Patients with Acute Coronary Syndromes: A Randomized Controlled Trial," JAMA®, Nov. 5, 2003, vol. 290, No. 17, 2292-2300, © 2003 American Medical Association, 10 pgs.

Perkovic, V., et al. (2019) Canagliflozin and Renal Outcomes in Type 2 Diabetes and Nephropathy. N Engl J Med, 380(24), 2295-2306.

Picaud, S. et al., "RVX-208, an inhibitor of BET transcriptional regulators with selectivity for the second bromodomain", PNAS, vol. 110, No. 49, 15 pgs, Dec. 3, 2013.

Rastogi, A. et al., (2017) SGLT2 Inhibitors Through the Windows of EMPA-REG and CANVAS Trials: A Review. Diabetes Ther, 8, 1245-1251.

Ray, K. K. et al., "Effect of selective BET protein inhibitor apabetalone on cardiovascular outcomes in patients with acute coronary syndrome and diabetes: Rationale, design, and baseline characteristics of the BETonMACE trial," Am. Heart J, 2019; 217:72-83, Copyright © 2019 Published by Elsevier, 12 pgs. https://doi.org/10.1016/j.ahj.2019.08.001.

Ray, K. K., et al., "Effect of Apabetalone Added to Standard Therapy on Major Adverse Cardiovascular Events in Patients With Recent Acute Coronary Syndrome and Type 2 Diabetes," JAMA, 2020, 323(16), 1565-1573 © 2020 American Medical Association, 9 pgs.

Schwartz, G. G., et al., (2012) Effects of Dalcetrapib in Patients with a Recent Acute Coronary Syndrome. N Engl J Med, 367(22), 2089-2099.

Schwartz, G. G. et al., (2018) Alirocumab and Cardiovascular Outcomes after Acute Coronary Syndrome. N Engl J Med, 379(22), 2097-107.

Schwartz, G. G. et al., "Relation of insulin treatment for type 2 diabetes to the risk of major adverse cardiovascular events after acute coronary syndrome: an analysis of the BETonMACE randomized clinical trial", Cardiovascular Diabetology, vol. 20, No. 1, Dec. 1, 2021 (Dec. 1, 2021), XP093087795, DOI: 10.1186/s12933-021-01311-9.

Scoble, J. E. et al., "Lipid Profiles in Patients with Atherosclerotic Renal Artery Stenosis," Nephron 1999, 83:117-121, © 1999 S. Karger AG, Basel, 5 pgs.

Shah, P. K. et al., "Effects of Recombinant Apolipoportein A-1 Milano on Aortic Atherosclerosis in Apolipoprotein E-Deficient Mice," Circulation, 1998;97:780-785, © 1998 American Heart Association, Inc., 7 pgs.

Siebel, A.L. et al. "Effects of the BET-Inhibitor, RVX-208 on the HDL Lipidome and Glucose Metabolism in Individuals with Prediabetes: A Randomized Controlled Trial," Metabolism Clinical and Experimental 65 (2016) 904-914, Accepted: Mar. 3, 2016, http://dx.doi.org/10.1016/j.metabol.2016.03.002, © 2016 Elsevier Inc., 11 pgs.

Tsujikawa, L. M. et al: "Apabetalone (RVX-208) reduces vascular inflammation in vitro and in CVD patients by a BET-dependent epigenetic mechanism". Clinical Epigenetics, (2019) 11:102. https://doi.org/10.1186/s13148-019-0696-z.

Wiviott, S.D. et al., (2019) Dapagliflozin and Cardiovascular Outcomes in Type 2 Diabetes. N Engl J Med, 380(4), 347-357.

Zinman, B. et al., (2015) Empagliflozin, cardiovascular outcomes, and mortality in type 2 diabetes. N Engl J Med, 373(22), 2117-28.

Clegg, Lindsay E. et al., "Reduction of Cardiovascular Risk and Improved Estimated Glomerular Filtration Rate by SGLT2 Inhibitors, Including Dapagliflozin, Is Consistent Across the Class: An Analysis of the Placebo Arm of EXSCEL," *Diabetes Care*, vol. 42, Feb. 2019, https://doi.org/10.2337/dc18-1871, © 2018 by the American Diabetes Association, care.diabetesjournals.org, 9 pgs.

Deedwania, P. et al., "Cardiovascular Protection with Anti-Hyperglycemic Agents," *American Journal of Cardiovascular Drugs*, (2019) 19:249-257, https://doi.org/10.1007/s40256-019-00325-9, © Springer Nature Switzerland AG 2019, Published online: Feb. 15, 2019, 9 pgs.

Ghosh, G.C. et al., "RVX 208: A Novel BET Protein Inhibitor, Role as an Inducer of APO A-1/HDL and Beyond," *Wiley Cardiovascular Therapeutics*, https://doi.org/10.1111/1755-5922.12265, © 2017 John Wiley & Sons Ltd., wileyonlinelibrary.com/journal/cdr, revised: Dec. 17, 2016, Accepted: Apr. 13, 2017, 10 pgs.

Verma, S. et al., "SGLT2 Inhibitors and Mechanisms of Cardiovascular Benefit: A State-of-the-Art Review," *Diabetologia*, (2018) 61:2108-2117, https://doi.org/10.1007/s00125-018-4670-7, © Springer-Verlag GmbH Germany, part of Springer Nature 2018, Accepted: Apr. 23, 2018, Published online: Aug. 22, 2018, 10 pgs.

(56) References Cited

OTHER PUBLICATIONS

Anker, S. D. et al., "Empagliflozin in Heart Failure with a Preserved Ejection Fraction," N. Engl. J. Med. 2021, 385(16), 1451-1461. doi: 10.1056/NEJMoa2107038.

Anonymous: "Apabetalone fails to benefit MACE, but 'cautious optimism' remains", Cardiology Today, Nov. 18, 2019 (Nov. 18, 2019), pp. 1-2, XP093115888, Retrieved from the Internet: URL: https://www.healio.com/news/cardiology/20191118/apabetalone-fails-to-benefit-mace-but-cautious-optimismremains [retrieved on Jan. 4, 2024].

Cannon, C. P. et al. (2020) Cardiovascular Outcomes with Ertugliflozin in Type 2 Diabetes. N. Engl J. Med., 383, 1425-1435. DOI: 10.1056/NEJMoa2004967.

Giugliano, D. et al., "Heart failure and type 2 diabetes: From cardiovascular outcome trials, with hope," Diabetes Obes Metab. 2019, 21, 1081-1087. DOI: 10.1111/dom.13629.

Kluger et al. "Class effects of SGLT2 inhibitors on cardiorenal outcomes," Cardiovasc Diabetol (2019) 18:99, 14 pages. https://doi.org/10.1186/s12933-019-0903-4.

Kluger et al. "Cardiorenal Outcomes in the CANVAS, DECLARE-TIMI 58, and EMPA-REG OUTCOME Trials: A Systematic Review," Rev. Cardiovasc. Med. 2018; 19(2): 41-49. DOI:10.31083/j.rcm.2018.02.907.

Kosiborod, M. et al., "Lower Risk of Heart Failure and Death in Patients Initiated on Sodium-Glucose Cotransporter-2 Inhibitors Versus Other Glucose-Lowering Drugs," Circulation (2017) 136, 249-259. DOI: 10.1161/CIRCULATIONAHA.117.029190.

Kosiborod, M. et al., "Cardiovascular Events Associated With SGLT-2 Inhibitors Versus Other Glucose-Lowering Drugs," JACC (2018) 23(17), 2628-2639. https://doi.org/10.1016/j.jacc.2018.03.009.

Kulikowski, E. et al., (Jun. 2016). RVX-208 Affects Epigenetics to Lower Major Adverse Cardiovascular Events (MACE) in Atherosclerotic Patients and Especially in Ones with Diabetes Mellitus. In Diabetes (vol. 65, pp. A317-A317).

Lajthia, E. et al. Combination therapy with once-weekly glucagon like peptide-1 receptor agonists and dipeptidyl peptidase-4 inhibitors in type 2 diabetes: a case series. Pharmacy Practice. (2019). 17(4): 1588. 6 pages.

Lim, J. et al., "Comparison of cardiovascular and renal outcomes between dapagliflozin and empagliflozin in patients with type 2 diabetes without prior cardiovascular or renal disease," PLOS ONE (2022) 17(10): e0269414. https://doi.org/10.1371/journal.pone.0269414.

McMurray, J.J.V. et al., "Dapagliflozin in Patients with Heart Failure and Reduced Ejection Fraction," N. Engl. J. Med. (2019) 381:1995-2008. DOI: 10.1056/NEJMoa1911303.

Nicholls, S. J., et al., "Apabetalone and hospitalization for heart failure in patients following an acute coronary syndrome: a prespecifed analysis of the BETonMACE study," Cardiovasc. Diabetol. (2021) 20:13, 9 pages. https://doi.org/10.1186/s12933-020-01199-x.

Ray K K et al: "P4608 BET-inhibition with Apabetalone in Post-ACS Patients with Diabetes: Design and Baseline Characteristics of the BETonMACE trial", European Heart Journal, vol. 40, No. Supplement_ 1, Oct. 1, 2019 (Oct. 1, 2019), XP093115548, GB ISSN: 0195-668X, DOI: 10.1093/eurheartj/ehz745.0991 Retrieved from the Internet: URL: http://academic.oup.com/eurheartj/article-pdf /40/Supplement_1/ehz745. 0991/30201372/ehz745.0991.pdf.

Ray K K et al: "Effect of BET Protein Inhibition With Apabetalone on Cardiovascular Outcomes in Patients With Acute Coronary Syndrome and Diabetes—Results of the BETonMACE Trial", Nov. 16, 2019 (Nov. 16, 2019), pp. 1-22, XP093115559 [retrieved on Jan. 3, 2024].

Sundström, J. et al. Synergistic effects of blood pressure-lowering drugs and statins: systematic review and meta-analysis. BMJ Evid Based Med. (2018). 23(2): 64-69.

Taeger, T. et al., "Comparative efficacy of sodium-glucose cotransporter-2 inhibitors (SGLT2i) for cardiovascular outcomes in type 2 diabetes: a systematic review and network meta-analysis of randomised controlled trials" Heart Failure Reviews (2021) 26:1421-1435. https://doi.org/10.1007/s10741-020-09954-8.

Yael Maxwell L: Apabetalone Falls Short in Diabetic ACS Patients With Low HDL: BETonMACE, Nov. 21, 2019 (Nov. 21, 2019), pp. 1-12, XP093116050, Retrieved from the Internet: URL:https://www.tctmd.com/news/apabetalone-falls-short-diabetic-acs-patients-low-hdlbetonmace [retrieved on Jan. 4, 2024].

* cited by examiner

METHODS OF TREATMENT AND/OR PREVENTION OF MAJOR ADVERSE CARDIOVASCULAR EVENTS (MACE) WITH A COMBINATION OF A BET BROMODOMAIN INHIBITOR AND A SODIUM DEPENDENT GLUCOSE TRANSPORT 2 INHIBITOR

This application is a national stage filing under 35 U.S.C. § 371 of International Application No. PCT/IB2020/000912, filed Nov. 4, 2020, which claims the benefit of priority of U.S. Provisional Application No. 62/930,860, filed Nov. 5, 2019, the entire disclosure of all of which are incorporated herein by reference in their entireties.

The present disclosure relates to methods of treating and/or preventing Major adverse cardiovascular events (MACE) (including non-fatal myocardial infarction, cardiovascular death, stroke, and hospitalization for cardiovascular disease (CVD) events) by administering to a subject in need thereof, a combination of a sodium-glucose transport protein 2 (SGLT2) inhibitor and a compound of Formula I or a stereoisomer, tautomer, pharmaceutically acceptable salt, or hydrate thereof.

Compounds of Formula I have previously been described in U.S. Pat. No. 8,053,440, incorporated herein by reference. Compounds of Formula I include:

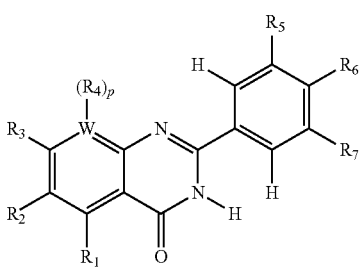

Formula I or a stereoisomer, tautomer, pharmaceutically acceptable salt, or hydrate thereof,
wherein:
$R_1$ and $R_3$ are each independently selected from alkoxy, alkyl, amino, halogen, and hydrogen;
$R_2$ is selected from alkoxy, alkyl, alkenyl, alkynyl, amide, amino, halogen, and hydrogen;
$R_5$ and $R_7$ are each independently selected from alkyl, alkoxy, amino, halogen, and hydrogen;
$R_6$ is selected from amino, amide, alkyl, hydrogen, hydroxyl, piperazinyl, and alkoxy;
W is selected from C and N, wherein if W is N, then p is 0 or 1, and if W is C, then p is 1; and
for $W$—$(R_4)_p$, W is C, p is 1 and $R_4$ is H, or W is N and p is 0.

Despite the use of modern evidence-based therapies including prompt coronary revascularization, dual antiplatelet therapy, and intensive lipid lowering therapy, major adverse cardiovascular events (MACE) recur with high frequency after an acute coronary syndrome (ACS). Patients with type 2 diabetes (T2DM) has a particular high risk and represents about one third of ACS cases (Cannon et al. 2015; Schwartz et al. 2013; Schwartz et al. 2018).

New therapies, such as SGLT2 inhibitors, which induce the secretion of glucose in the urine by inhibition of sodium glucose transport protein 2 (Zinman et al. 2015; Neal et al. 2017; Perkovic et al. 2019) has shown reduction of cardiovascular-related disorder risk in patients with established cardiovascular disease, diabetes and chronic kidney disease (Zinman et al. 2015; Neal et al. 2017; Perkovic et al. 2019). However, no diabetes medication has been shown to reduce MACE in patients with recent ACS and substantial residual risk remains for this population.

The ability of SGLT2 inhibitors in reducing MACE in type 2 diabetes patients has been studied in several clinical trials, such as EMPA-REG OUTCOME for empaglifozin (NCT01131676); CANVAS Program for canaglifozin (NCT01032629 and NCT01989754); and DECLARE-TIMI (NCT01730534) for dapaglifozin. To summarize, empaglifozin was shown to have the ability to mildly reduce narrowly defined MACE by 14% (Hazard Ratio [HR], 0.86; 95% CI, 0.74-0.99) and broadly defined MACE by 11% (HR 0.89, 95% CI, 0.78-1.01) (Guettier, J. M. Endocrinologic and Metabolic Drugs Advisory Committee (EMDAC) Meeting, Jun. 28, 2016, U.S. Food and Drug Administration (FDA)). However, with the exception of cardiovascular deaths (HR 0.62, 95% CI, 0.49-0.77), empaglifozin did not show any reduction in the individual MACE events (i.e., HR 1.0) (Rastogi et al. (2017) Diabetes Ther, 8:1245-1251). Canaglifozin was also shown to have the ability to mildly reduce narrowly defined MACE by 14% (HR 0.86, 95% CI, 0.75-0.97) (Carbone et al. (2019) Cardiovasc Diabetol, 18(64):1-13). Although canaglifozin was associated with reductions in the individual MACE events, these individual effects did not reach statistical significance (Carbone et al.). As for dapagliflozin, treatment with this SGLT2 did not result in a higher or lower rate of narrowly defined MACE than placebo (HR 0.93, 95% CI, 0.82-1.04) but did result in a modest reduction of 17% in cardiovascular death or hospitalization for heart failure (HR 0.83, 95% CI, 0.73-0.95) (Wiviott et al., N Engl J Med, 380(4):347-357). A recently completed clinical Phase 3 trial (BETonMACE; NCT02586155) evaluated the effect on MACE of apabetalone (RVX-208) in type 2 diabetes patients with low HDL cholesterol (below 40 mg/dL for males and below 45 mg/dL for females) and a recent ACS (preceding 7-90 days). All patients received high intensity statin treatment as well as other evidence-based treatments. The study enrolled 2,425 patients and the MACE outcome population consisted of 2,418 patients. A total of 150 patients received both RVX-208 and an SGLT2 inhibitor; a total of 148 received an SGLT2 inhibitor, but no RVX-208; a total of 1,062 received RVX-208, but no SGLT2 inhibitor; a total of 1,058 received neither RVX-208 or an SGLT2 inhibitor.

Surprisingly, as detailed in Example 2, we found that patients treated with the combination RVX-208 and an SGLT2 inhibitor showed pronounced reduction of cardiovascular-related disorders and cardiovascular disease (CVD) events, as measured by MACE reduction, compared to treatment with either therapy alone. The results discussed in Example 2 consistently demonstrate that apabetalone by itself has the ability to reduce hazard ratios or the number of patients having a MACE event (as a single composite end point of the events non-fatal myocardial infarction, cardiovascular death, stroke and optionally hospitalization for cardiovascular diseases) or a specific MACE event such as myocardial infarction, cardiovascular death, hospitalization for cardiovascular diseases and hospitalization for congestive heart failure (see FIGS. 2, 5, 8, 11, 14, and 17). However, when apabetalone was combined with a SGLT2 inhibitor, the number of patients having a MACE event as a whole or a specific individual MACE event as described above was unexpectedly and consistently reduced to an extent that reached statistical significance and far exceeded the additive effects of apabetalone and the SGLT2 inhibitor individually (e.g., at least about 50% and up to about 70%; see FIGS. 1, 3, 4, 6, 7, 9, 10, 12, 13, 15, 16, and 18) and SGLT2 monotherapy clinical trial results described above.

The effect of the co-administration of RVX-208 and SGLT2 inhibitors—quantified using cardiovascular-related disorders adjudicated by an independent medical advisory committee—illustrated a significant reduction of events compared to placebo and SGLT2 inhibitors [HR=0.40 (95% CI, 0.16–1.00; p=0.05)].

The present invention provides methods of treating and/or preventing Major adverse cardiovascular events (MACE) (including non-fatal myocardial infarction, cardiovascular death, stroke, and hospitalization for CVD events) by administering to a subject in need thereof, a sodium-glucose transport protein 2 (SGLT2) inhibitor and a compound of Formula I or a stereoisomer, tautomer, pharmaceutically acceptable salt, or hydrate thereof.

In some embodiments, the invention provides methods of preventing cardiovascular death by administering to a subject in need thereof, a sodium-glucose transport protein 2 (SGLT2) inhibitor and a compound of Formula I or a stereoisomer, tautomer, pharmaceutically acceptable salt, or hydrate thereof.

In some embodiments, the invention provides methods of treating and/or preventing hospitalization for CVD events by administering to a subject in need thereof, a sodium-glucose transport protein 2 (SGLT2) inhibitor and a compound of Formula I or a stereoisomer, tautomer, pharmaceutically acceptable salt, or hydrate thereof.

In some embodiments, the invention provides methods of treating and/or preventing a non-fatal myocardial infarction by administering to a subject in need thereof, a sodium-glucose transport protein 2 (SGLT2) inhibitor and a compound of Formula I or a stereoisomer, tautomer, pharmaceutically acceptable salt, or hydrate thereof.

In some embodiments, the compound of Formula I is administered simultaneously with a SGLT2 inhibitor. In some embodiments, the Compound of Formula I is administered sequentially with the SGLT2 inhibitor. In some embodiments, the Compound of Formula I is administered in a single pharmaceutical composition with the SGLT2 inhibitor. In some embodiments, the Compound of Formula I and the SGLT2 inhibitor are administered as separate compositions.

In some embodiments, the compound of Formula Ia is selected from

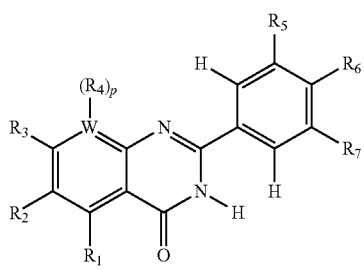

Formula Ia or a stereoisomer, tautomer, pharmaceutically acceptable salt, or hydrate thereof,
wherein:
$R_1$ and $R_3$ are each independently selected from alkoxy, alkyl, and hydrogen;
$R_2$ is selected from alkoxy, alkyl, and hydrogen;
$R_5$ and $R_7$ are each independently selected from alkyl, alkoxy, and hydrogen;
$R_6$ is selected from alkyl, hydroxyl, and alkoxy;
W is selected from C and N, wherein if W is N, then p is 0 or 1, and if W is C, then p is 1; and
for W—$(R_4)_p$, W is C, p is 1 and $R_4$ is H, or W is N and p is 0.

In some embodiments, the Compound of Formula I is 2-(4-(2-hydroxyethoxy)-3,5-dimethylphenyl)-5,7-dimethoxyquinazolin-4(3H)-one (RVX-208 or RVX000222) or a pharmaceutically acceptable salt thereof.

In some embodiments, the SGLT2 inhibitor is empagliflozin, canagliflozin, dapagliflozin, remogliflozin, ipragliflozin, or HM41322. In some embodiments, the SGLT2 inhibitor is bexagliflozin, ertugliflozin, sotagliflozin, luseogliflozin, or tofogliflozin.

In some embodiments, the MACE endpoint is narrowly defined as a single composite endpoint of cardiovascular (CV) death, non-fatal myocardial infarction, or stroke.

In some embodiments, the MACE endpoint is broadly defined as a single composite endpoint of cardiovascular (CV) death, non-fatal myocardial infarction, hospitalization for CVD events, or stroke.

DEFINITIONS

Figure 1:
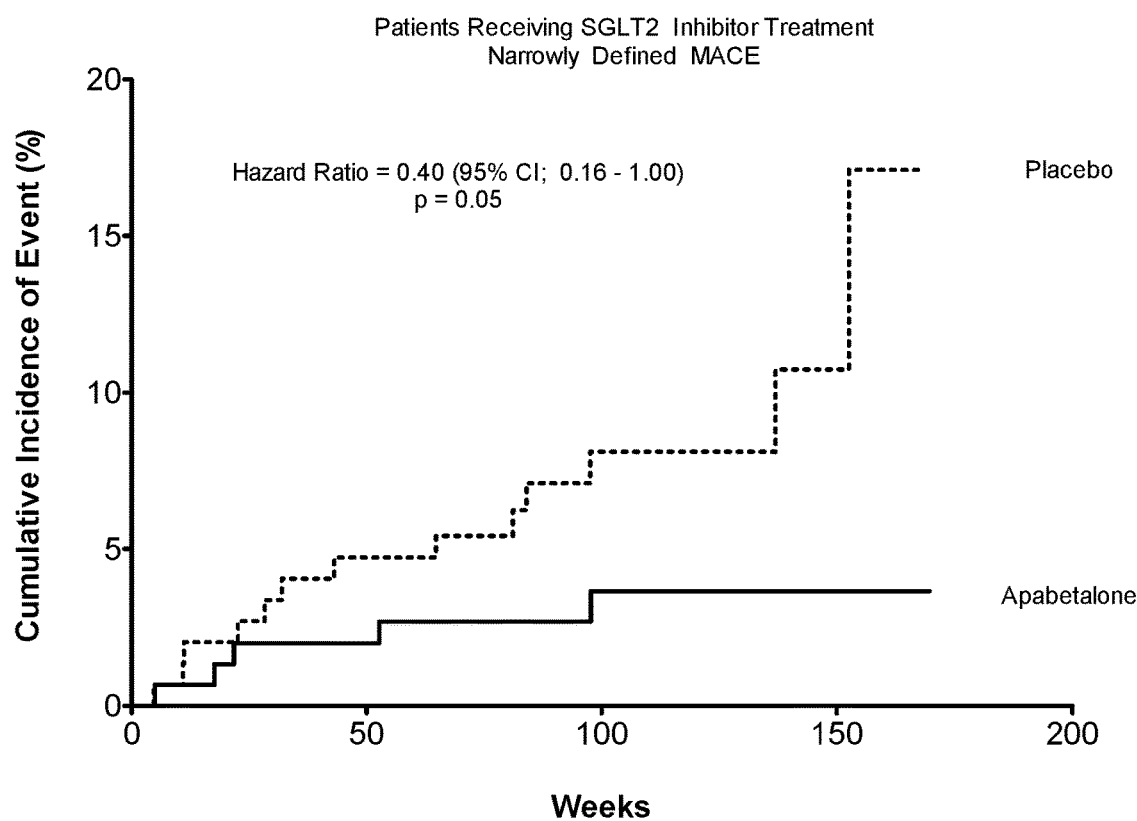
FIG. 1 depicts a comparison of the cumulative incidence of narrowly defined MACE in patients administered RVX-208 with SGLT2 inhibitors versus patients administered placebo with SGLT2 inhibitors.

By "optional" or "optionally" is meant that the subsequently described event or circumstance may or may not occur, and that the description includes instances where the event or circumstance occurs and instances in which is does not. For example, "optionally substituted aryl" encompasses both "aryl" and "substituted aryl" as defined below. It will be understood by those skilled in the art, with respect to any group containing one or more substituents, that such groups are not intended to introduce any substitution or substitution patterns that are sterically impractical, synthetically non-feasible and/or inherently unstable.

As used herein, the term "hydrate" refers to a crystal form with either a stoichiometric or non-stoichiometric amount of water is incorporated into the crystal structure.

The term "alkenyl" as used herein refers to an unsaturated straight or branched hydrocarbon having at least one carbon-carbon double bond, such as a straight or branched group of 2-8 carbon atoms, referred to herein as $(C_2-C_8)$ alkenyl. Exemplary alkenyl groups include, but are not limited to, vinyl, allyl, butenyl, pentenyl, hexenyl, butadienyl, pentadienyl, hexadienyl, 2-ethylhexenyl, 2 propyl 2-butenyl, and 4-(2-methyl-3-butene)-pentenyl.

The term "alkoxy" as used herein refers to an alkyl group attached to an oxygen (O-alkyl). "Alkoxy" groups also include an alkenyl group attached to an oxygen ("alkenyloxy") or an alkynyl group attached to an oxygen ("alkynyloxy") groups. Exemplary alkoxy groups include, but are not limited to, groups with an alkyl, alkenyl or alkynyl group of 1-8 carbon atoms, referred to herein as $(C_1-C_8)$ alkoxy. Exemplary alkoxy groups include, but are not limited to, methoxy and ethoxy.

The term "alkyl" as used herein refers to a saturated straight or branched hydrocarbon, such as a straight or branched group of 1-8 carbon atoms, referred to herein as $(C_1-C_8)$ alkyl. Exemplary alkyl groups include, but are not limited to, methyl, ethyl, propyl, isopropyl, 2-methyl-1-propyl, 2-methyl-2-propyl, 2-methyl-1-butyl, 3 methyl-1-butyl, 2-methyl-3-butyl, 2,2-dimethyl-1-propyl, 2-methyl-1-pentyl, 3 methyl-1-pentyl, 4-methyl-1-pentyl, 2-methyl-2-pentyl, 3-methyl-2-pentyl, 4 methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl, and octyl.

The term "amide" as used herein refers to the form $NR_aC(O)(R_b)$ or $C(O)NR_bR_c$, wherein $R_a$, $R_b$ and $R_c$ are each independently selected from alkyl, alkenyl, alkynyl, aryl, arylalkyl, cycloalkyl, haloalkyl, heteroaryl, heterocyclyl, and hydrogen. The amide can be attached to another group through the carbon, the nitrogen, $R_b$, or $R_c$. The amide also may be cyclic, for example $R_b$ and $R_c$, may be joined to form a 3- to 8-membered ring, such as 5- or 6-membered ring. The term "amide" encompasses groups such as sulfonamide, urea, ureido, carbamate, carbamic acid, and cyclic versions thereof. The term "amide" also encompasses an amide group attached to a carboxy group, e.g., amide-COOH or salts such as amide-COONa, an amino group attached to a carboxy group (e.g., amino-COOH or salts such as amino-COONa).

The term "amine" or "amino" as used herein refers to the form $NR_dR_e$ or $N(R_d)R_e$, where $R_d$ and $R_e$ are independently selected from alkyl, alkenyl, alkynyl, aryl, arylalkyl, carbamate, cycloalkyl, haloalkyl, heteroaryl, heterocycle, and hydrogen. The amino can be attached to the parent molecular group through the nitrogen. The amino also may be cyclic, for example any two of $R_d$ and $R_e$ may be joined together or with the N to form a 3- to 12-membered ring (e.g., morpholino or piperidinyl). The term amino also includes the corresponding quaternary ammonium salt of any amino group. Exemplary amino groups include alkylamino groups, wherein at least one of $R_d$ and $R_e$ is an alkyl group. In some embodiments $R_d$ and $R_e$ each may be optionally substituted with hydroxyl, halogen, alkoxy, ester, or amino.

The term "aryl" as used herein refers to a mono-, bi-, or other multi carbocyclic, aromatic ring system. The aryl group can optionally be fused to one or more rings selected from aryls, cycloalkyls, and heterocyclyls. The aryl groups of this present disclosure can be substituted with groups selected from alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide, and thioketone. Exemplary aryl groups include, but are not limited to, phenyl, tolyl, anthracenyl, fluorenyl, indenyl, azulenyl, and naphthyl, as well as benzo-fused carbocyclic moieties such as 5,6,7,8-tetrahydronaphthyl. Exemplary aryl groups also include but are not limited to a monocyclic aromatic ring system, wherein the ring comprises 6 carbon atoms, referred to herein as "$(C_6)$ aryl."

The term "arylalkyl" as used herein refers to an alkyl group having at least one aryl substituent (e.g., aryl-alkyl). Exemplary arylalkyl groups include, but are not limited to, arylalkyls having a monocyclic aromatic ring system, wherein the ring comprises 6 carbon atoms, referred to herein as "$(C_6)$ arylalkyl."

The term "carbamate" as used herein refers to the form $R_gOC(O)N(R_h)$, $R_gOC(O)N(R_h)R_i$, or $OC(O)NR_hR_i$, wherein $R_g$, $R_h$ and $R_i$ are each independently selected from alkyl, alkenyl, alkynyl, aryl, arylalkyl, cycloalkyl, haloalkyl, heteroaryl, heterocyclyl, and hydrogen. Exemplary carbamates include, but are not limited to, arylcarbamates or heteroaryl carbamates (e.g., wherein at least one of $R_g$, $R_h$ and $R_i$ are independently selected from aryl or heteroaryl, such as pyridine, pyridazine, pyrimidine, and pyrazine).

The term "carbocycle" as used herein refers to an aryl or cycloalkyl group.

The term "carboxy" as used herein refers to COOH or its corresponding carboxylate salts (e.g., COONa). The term carboxy also includes "carboxycarbonyl," e.g. a carboxy group attached to a carbonyl group, e.g., C(O)—COOH or salts, such as C(O)—COONa.

The term "cycloalkoxy" as used herein refers to a cycloalkyl group attached to an oxygen.

The term "cycloalkyl" as used herein refers to a saturated or unsaturated cyclic, bicyclic, or bridged bicyclic hydrocarbon group of 3-12 carbons, or 3-8 carbons, referred to herein as "($C_3$-$C_8$)cycloalkyl," derived from a cycloalkane. Exemplary cycloalkyl groups include, but are not limited to, cyclohexanes, cyclohexenes, cyclopentanes, and cyclopentenes. Cycloalkyl groups may be substituted with alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide and thioketone. Cycloalkyl groups can be fused to other cycloalkyl saturated or unsaturated, aryl, or heterocyclyl groups.

The term "dicarboxylic acid" as used herein refers to a group containing at least two carboxylic acid groups such as saturated and unsaturated hydrocarbon dicarboxylic acids and salts thereof. Exemplary dicarboxylic acids include alkyl dicarboxylic acids. Dicarboxylic acids may be substituted with alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydrogen, hydroxyl, ketone, nitro, phosphate, sulfide, sulfinyl, sulfonyl, sulfonic acid, sulfonamide and thioketone. Dicarboxylic acids include, but are not limited to succinic acid, glutaric acid, adipic acid, suberic acid, sebacic acid, azelaic acid, maleic acid, phthalic acid, aspartic acid, glutamic acid, malonic acid, fumaric acid, (+)/(−)-malic acid, (+)/(−) tartaric acid, isophthalic acid, and terephthalic acid. Dicarboxylic acids further include carboxylic acid derivatives thereof, such as anhydrides, imides, hydrazides (for example, succinic anhydride and succinimide).

The term "ester" refers to the structure C(O)O—, C(O)OR$_j$, R$_k$C(O)O—R$_j$, or R$_k$C(O)O—, where O is not bound to hydrogen, and R$_j$ and R$_k$ can independently be selected from alkoxy, aryloxy, alkyl, alkenyl, alkynyl, amide, amino, aryl, arylalkyl, cycloalkyl, ether, haloalkyl, heteroaryl, and heterocyclyl. R$_k$ can be a hydrogen, but R$_j$ cannot be hydrogen. The ester may be cyclic, for example the carbon atom and R$_j$, the oxygen atom and R$_k$, or R$_j$ and R$_k$ may be joined to form a 3- to 12-membered ring. Exemplary esters include, but are not limited to, alkyl esters wherein at least one of R$_j$ and R$_k$ is alkyl, such as O—C(O) alkyl, C(O)—O-alkyl, and alkyl C(O)—O-alkyl. Exemplary esters also include aryl or heteroaryl esters, e.g. wherein at least one of R$_j$ and R$_k$ is a heteroaryl group such as pyridine, pyridazine, pyrimidine and pyrazine, such as a nicotinate ester. Exemplary esters also include reverse esters having the structure R$_k$C(O)O—, where the oxygen is bound to the parent molecule. Exemplary reverse esters include succinate, D-argininate, L-argininate, L-lysinate and D-lysinate. Esters also include carboxylic acid anhydrides and acid halides.

The terms "halo" or "halogen" as used herein refer to F, Cl, Br, or I.

The term "haloalkyl" as used herein refers to an alkyl group substituted with one or more halogen atoms. "haloalkyls" also encompass alkenyl or alkynyl groups substituted with one or more halogen atoms.

The term "heteroaryl" as used herein refers to a mono-, bi-, or multi-cyclic, aromatic ring system containing one or more heteroatoms, for example 1 to 3 heteroatoms, such as nitrogen, oxygen, and sulfur. Heteroaryls can be substituted with one or more substituents including alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide and thioketone. Heteroaryls can also be fused to non-aromatic rings. Illustrative examples of heteroaryl groups include, but are not limited to, pyridinyl, pyridazinyl, pyrimidyl, pyrazyl, triazinyl, pyrrolyl, pyrazolyl, imidazolyl, (1,2,3)- and (1,2,4)-triazolyl, pyrazinyl, pyrimidilyl, tetrazolyl, furyl, thienyl, isoxazolyl, thiazolyl, furyl, phenyl, isoxazolyl, and oxazolyl. Exemplary heteroaryl groups include, but are not limited to, a monocyclic aromatic ring, wherein the ring comprises 2-5 carbon atoms and 1-3 heteroatoms, referred to herein as "($C_2$-$C_5$) heteroaryl."

The terms "heterocycle," "heterocyclyl," or "heterocyclic" as used herein refer to a saturated or unsaturated 3, 4, 5-, 6- or 7-membered ring containing one, two, or three heteroatoms independently selected from nitrogen, oxygen, and sulfur. Heterocycles can be aromatic (heteroaryls) or non-aromatic. Heterocycles can be substituted with one or more substituents including alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide and thioketone. Heterocycles also include bicyclic, tricyclic, and tetracyclic groups in which any of the above heterocyclic rings is fused to one or two rings independently selected from aryls, cycloalkyls, and heterocycles. Exemplary heterocycles include acridinyl, benzimidazolyl, benzofuryl, benzothiazolyl, benzothienyl, benzoxazolyl, biotinyl, cinnolinyl, dihydrofuryl, dihydroindolyl, dihydropyranyl, dihydrothienyl, dithiazolyl, furyl, homopiperidinyl, imidazolidinyl, imidazolinyl, imidazolyl, indolyl, isoquinolyl, isothiazolidinyl, isothiazolyl, isoxazolidinyl, isoxazolyl, morpholinyl, oxadiazolyl, oxazolidinyl, oxazolyl, piperazinyl, piperidinyl, pyranyl, pyrazolidinyl, pyrazinyl, pyrazolyl, pyrazolinyl, pyridazinyl, pyridyl, pyrimidinyl, pyrimidyl, pyrrolidinyl, pyrrolidin-2-onyl, pyrrolinyl, pyrrolyl, quinolinyl, quinoxaloyl, tetrahydrofuryl, tetrahydroisoquinolyl, tetrahydropyranyl, tetrahydroquinolyl, tetrazolyl, thiadiazolyl, thiazolidinyl, thiazolyl, thienyl, thiomorpholinyl, thiopyranyl, and triazolyl.

The terms "hydroxy" and "hydroxyl" as used herein refer to —OH.

The term "hydroxyalkyl" as used herein refers to a hydroxy attached to an alkyl group.

The term "hydroxyaryl" as used herein refers to a hydroxy attached to an aryl group.

The term "ketone" as used herein refers to the structure C(O)—R$_n$ (such as acetyl, C(O)CH$_3$) or R$_n$—C(O)—R$_o$. The ketone can be attached to another group through R$_n$ or R$_o$. R$_n$ and R$_o$ can be alkyl, alkenyl, alkynyl, cycloalkyl, heterocyclyl or aryl, or R$_n$ and R$_o$ can be joined to form a 3- to 12 membered ring.

The term "phenyl" as used herein refers to a 6-membered carbocyclic aromatic ring. The phenyl group can also be fused to a cyclohexane or cyclopentane ring. Phenyl can be substituted with one or more substituents including alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, phosphate, sulfide, sulfinyl, sulfonyl, sulfonic acid, sulfonamide and thioketone.

The term "thioalkyl" as used herein refers to an alkyl group attached to a sulfur (S-alkyl).

"Alkyl," "alkenyl," "alkynyl", "alkoxy", "amino" and "amide" groups can be optionally substituted with or interrupted by or branched with at least one group selected from alkoxy, aryloxy, alkyl, alkenyl, alkynyl, amide, amino, aryl, arylalkyl, carbamate, carbonyl, carboxy, cyano, cycloalkyl, ester, ether, formyl, halogen, haloalkyl, heteroaryl, heterocyclyl, hydroxyl, ketone, phosphate, sulfide, sulfinyl, sulfonyl, sulfonic acid, sulfonamide, thioketone, ureido and N. The substituents may be branched to form a substituted or unsubstituted heterocycle or cycloalkyl.

As used herein, a suitable substitution on an optionally substituted substituent refers to a group that does not nullify the synthetic or pharmaceutical utility of the compounds of the present disclosure or the intermediates useful for preparing them. Examples of suitable substitutions include, but are not limited to: $C_1$-$C_8$ alkyl; $C_2$-$C_8$ alkenyl or alkynyl; $C_6$ aryl, 5- or 6-membered heteroaryl; $C_3$-$C_7$ cycloalkyl; $C_1$-$C_8$ alkoxy; $C_6$ aryloxy; CN; OH; oxo; halo, carboxy; amino, such as NH($C_1$-$C_8$ alkyl), N($C_1$-$C_8$ alkyl)$_2$, NH(($C_6$) aryl), or N(($C_6$) aryl)$_2$; formyl; ketones, such as CO($C_1$-$C_8$ alkyl), —CO(($C_6$ aryl) esters, such as $CO_2$($C_1$-$C_8$ alkyl) and $CO_2$ ($C_6$ aryl). One of skill in the art can readily choose a suitable substitution based on the stability and pharmacological and synthetic activity of the compound of the present disclosure.

The term "pharmaceutically acceptable composition" as used herein refers to a composition comprising at least one compound as disclosed herein formulated together with one or more pharmaceutically acceptable carriers.

The term "pharmaceutically acceptable carrier" as used herein refers to any and all solvents, dispersion media, coatings, isotonic and absorption delaying agents, and the like, that are compatible with pharmaceutical administration. The use of such media and agents for pharmaceutically active substances is well known in the art. The compositions may also contain other active compounds providing supplemental, additional, or enhanced therapeutic functions. The term "pharmaceutically acceptable composition" as used herein refers to a composition comprising at least one compound as disclosed herein formulated together with one or more pharmaceutically acceptable carriers.

The term "pharmaceutically acceptable prodrugs" as used herein represents those prodrugs of the compounds of the present invention that are, within the scope of sound medical judgment, suitable for use in contact with the tissues of humans and lower animals without undue toxicity, irritation, allergic response, commensurate with a reasonable benefit/risk ratio, and effective for their intended use, as well as the zwitterionic forms, where possible, of the compounds of Formula I. A discussion is provided in Higuchi et al., "Prodrugs as Novel Delivery Systems," *ACS Symposium Series*, Vol. 14, and in Roche, E. B., ed. *Bioreversible Carriers in Drug Design*, American Pharmaceutical Association and Pergamon Press, 1987, both of which are incorporated herein by reference.

The term "pharmaceutically acceptable salt(s)" refers to salts of acidic or basic groups that may be present in compounds used in the present compositions. Compounds included in the present compositions that are basic in nature are capable of forming a wide variety of salts with various inorganic and organic acids. The acids that may be used to prepare pharmaceutically acceptable acid addition salts of such basic compounds are those that form non-toxic acid addition salts, i.e., salts containing pharmacologically acceptable anions, including but not limited to sulfate, citrate, matate, acetate, oxalate, chloride, bromide, iodide, nitrate, sulfate, bisulfate, phosphate, acid phosphate, isonicotinate, acetate, lactate, salicylate, citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate and pamoate (i.e., 1,1'-methylene-bis-(2-hydroxy-3-naphthoate)) salts. Compounds included in the present compositions that include an amino moiety may form pharmaceutically acceptable salts with various amino acids, in addition to the acids mentioned above. Compounds included in the present compositions, that are acidic in nature are capable of forming base salts with various pharmacologically acceptable cations. Examples of such salts include alkali metal or alkaline earth metal salts and, particularly, calcium, magnesium, sodium, lithium, zinc, potassium, and iron salts.

In addition, if the compounds described herein are obtained as an acid addition salt, the free base can be obtained by basifying a solution of the acid salt. Conversely, if the product is a free base, an addition salt, particularly a pharmaceutically acceptable addition salt, may be produced by dissolving the free base in a suitable organic solvent and treating the solution with an acid, in accordance with conventional procedures for preparing acid addition salts from base compounds. Those skilled in the art will recognize various synthetic methodologies that may be used to prepare non-toxic pharmaceutically acceptable addition salts.

The compounds of Formula I or Ia may contain one or more chiral centers and/or double bonds and, therefore, exist as stereoisomers, such as geometric isomers, enantiomers or diastereomers. The term "stereoisomers" when used herein consist of all geometric isomers, enantiomers or diastereomers. These compounds may be designated by the symbols "R" or "S," depending on the configuration of substituents around the stereogenic carbon atom. The present invention encompasses various stereoisomers of these compounds and mixtures thereof. Stereoisomers include enantiomers and diastereomers. Mixtures of enantiomers or diastereomers may be designated "(±)" in nomenclature, but the skilled artisan will recognize that a structure may denote a chiral center implicitly.

Individual stereoisomers of compounds for use in the methods of the present invention can be prepared synthetically from commercially available starting materials that contain asymmetric or stereogenic centers, or by preparation of racemic mixtures followed by resolution methods well known to those of ordinary skill in the art. These methods of resolution are exemplified by (1) attachment of a mixture of enantiomers to a chiral auxiliary, separation of the resulting mixture of diastereomers by recrystallization or chromatography and liberation of the optically pure product from the auxiliary, (2) salt formation employing an optically active resolving agent, or (3) direct separation of the mixture of optical enantiomers on chiral chromatographic columns. Stereoisomeric mixtures can also be resolved into their component stereoisomers by well-known methods, such as chiral-phase gas chromatography, chiral-phase high performance liquid chromatography, crystallizing the compound as a chiral salt complex, or crystallizing the compound in a chiral solvent. Stereoisomers can also be obtained from stereomerically-pure intermediates, reagents, and catalysts by well-known asymmetric synthetic methods.

Geometric isomers can also exist in the compounds of Formula I or Ia. The present invention encompasses the various geometric isomers and mixtures thereof resulting from the arrangement of substituents around a carbon-carbon double bond or arrangement of substituents around a carbocyclic ring. Substituents around a carbon-carbon double bond are designated as being in the "Z" or "E" configuration wherein the terms "Z" and "E" are used in accordance with IUPAC standards. Unless otherwise specified, structures depicting double bonds encompass both the E and Z isomers.

Substituents around a carbon-carbon double bond alternatively can be referred to as "cis" or "trans," where "cis" represents substituents on the same side of the double bond and "trans" represents substituents on opposite sides of the double bond. The arrangements of substituents around a carbocyclic ring are designated as "cis" or "trans." The term "cis" represents substituents on the same side of the plane of the ring and the term "trans" represents substituents on opposite sides of the plane of the ring. Mixtures of compounds wherein the substituents are disposed on both the same and opposite sides of plane of the ring are designated "cis/trans."

The compounds of Formula I disclosed herein may exist as tautomers and both tautomeric forms are intended to be encompassed by the scope of the invention, even though only one tautomeric structure is depicted.

As used herein, the term "SGLT2 inhibitor" refers a substance, such as a small molecule organic chemistry compounds 1 kDa) or a large biomolecule such as a peptide (e.g., a soluble peptide), protein (e.g., an antibody), nucleic acid (e.g., siRNA) or a conjugate combining any two or more of the foregoing, that possesses the activity of inhibiting sodium-glucose transport protein 2 (SGLT2). Non-limiting examples of SGLT2 inhibitors include empagliflozin, canagliflozin, dapagliflozin, remogliflozin, ipragliflozin, HM41322, bexagliflozin, ertugliflozin, sotagliflozin, luseogliflozin, tofogliflozin, or a pharmaceutically acceptable salt of any of the foregoing. Additional examples of SGLT2 inhibitors are disclosed in WO01/027128, WO04/013118, WO04/080990, EP1852439A1, WO01/27128, WO03/099836, WO2005/092877, WO2006/034489, WO2006/064033, WO2006/117359, WO2006/117360, WO2007/025943, WO2007/028814, WO2007/031548, WO2007/093610, WO2007/128749, WO2008/049923, WO2008/055870, and WO2008/055940, each of which is incorporated herein by reference in its entirety.

As used herein, "treatment" or "treating" refers to an amelioration of a disease or disorder, or at least one discernible symptom thereof. In another embodiment, "treatment" or "treating" refers to an amelioration of at least one measurable physical parameter, not necessarily discernible by the patient. In yet another embodiment, "treatment" or "treating" refers to reducing the progression of a disease or disorder, either physically, e.g., stabilization of a discernible symptom, physiologically, e.g., stabilization of a physical parameter, or both. In yet another embodiment, "treatment" or "treating" refers to delaying the onset or progression of a disease or disorder. For example, treating a cholesterol disorder may comprise decreasing blood cholesterol levels.

As used herein, "prevention" or "preventing" refers to a reduction of the risk of acquiring a given disease or disorder or a symptom of a given disease or disorder.

The term "narrowly defined MACE" is defined as a single composite endpoint of Cardiovascular (CV) death, non-fatal Myocardial infarction, or stroke.

The term "broadly defined MACE" is defined as a single composite endpoint of Cardiovascular (CV) death, non-fatal Myocardial infarction, hospitalization for CVD events, or stroke.

As used herein, "cardiovascular disease events" or "CVD events" are physical manifestations of cardiovascular-related disorders, and include events such as stroke, non-fatal myocardial infarction, cardiovascular death, and hospitalization for CVD events and congestive heart failure. As used herein, "hospitalization for CVD events" is defined as hospitalization for unstable angina, symptoms of progressive obstructive coronary disease, emergency revascularization procedures at any time, or urgent revascularization procedures 30 days after the index events prior to randomization. In some embodiments, "hospitalization for CVD events" includes hospitalization for physical manifestations of cardiovascular-related disorders, including congestive heart failure. In one embodiment, the hospitalization for CVD events is hospitalization for congestive heart failure.

As used herein, "cardiovascular-related disorders" include: cardiovascular death, non-fatal myocardial infarction, stroke, hospitalization for CVD events which includes unstable angina, symptoms of progressive obstructive coronary disease, emergency revascularization procedures at any time, or urgent revascularization procedures 30 days after index event, and congestive heart failure.

EXEMPLARY EMBODIMENTS OF THE INVENTION

In one embodiment, the present invention provides methods of treating and/or preventing Major adverse cardiovascular events (MACE), including non-fatal myocardial infarction, CV death, stroke, and hospitalization for CVD events, by administering to a subject in need thereof, a combination of a sodium-glucose transport protein 2 (SGLT2) inhibitor and a compound of Formula I or a stereoisomer, tautomer, pharmaceutically acceptable salt, or hydrate thereof, wherein:

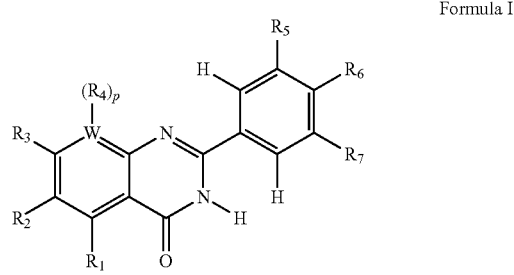

Formula I or a stereoisomer, tautomer, pharmaceutically acceptable salt, or hydrate thereof, wherein:

$R_1$ and $R_3$ are each independently selected from alkoxy, alkyl, amino, halogen, and hydrogen;

$R_2$ is selected from alkoxy, alkyl, alkenyl, alkynyl, amide, amino, halogen, and hydrogen;

$R_5$ and $R_7$ are each independently selected from alkyl, alkoxy, amino, halogen, and hydrogen;

$R_6$ is selected from amino, amide, alkyl, hydrogen, hydroxyl, piperazinyl, and alkoxy;

W is selected from C and N, wherein if W is N, then p is 0 or 1, and if W is C, then p is 1; and for W—$(R_4)_p$, W is C, p is 1 and $R_4$ is H, or W is N and p is 0.

In one embodiment, the compound of Formula I is 2-(4-(2-hydroxyethoxy)-3,5-dimethylphenyl)-5,7-dimethoxyquinazolin-4(3H)-one (RVX-208 or RVX000222) or a pharmaceutically acceptable salt thereof.

In some embodiments, the SGLT2 inhibitor is selected from empagliflozin, canagliflozin, dapagliflozin, and HM41322. In some embodiments, the SGLT2 inhibitor is selected from bexagliflozin, ertugliflozin, sotagliflozin, luseogliflozin, and tofogliflozin.

In one embodiment, the MACE endpoint is narrowly defined as a single composite endpoint of cardiovascular (CV) death, non-fatal myocardial infarction, or stroke.

In one embodiment, the MACE endpoint is broadly defined as a single composite endpoint of cardiovascular (CV) death, non-fatal myocardial infarction, hospitalization for CVD events, or stroke.

In one embodiment, the method for treating and/or preventing any individual component of MACE, including cardiovascular (CV) death, non-fatal myocardial infarction, hospitalization for CVD events, or stroke by administrating to a subject in need thereof, a sodium-glucose transport protein 2 (SGLT2) inhibitor and a Compound of Formula Ia or a stereoisomer, tautomer, pharmaceutically acceptable salt, or hydrate thereof, wherein:

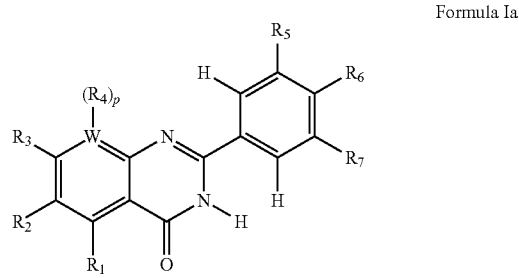

Formula Ia $R_1$ and $R_3$ are each independently selected from alkoxy, alkyl, and hydrogen;

$R_2$ is selected from alkoxy, alkyl, and hydrogen;

$R_5$ and $R_7$ are each independently selected from alkyl, alkoxy, amino, halogen, and hydrogen;

$R_6$ is selected from alkyl, hydroxyl, and alkoxy;

W is selected from C and N, wherein if W is N, then p is 0 or 1, and if W is C, then p is 1; and for W—$(R_4)_p$, W is C, p is 1 and $R_4$ is H, or W is N and p is 0.

In one embodiment, the compound of Formula I is administered simultaneously with the SGLT2 inhibitor.

In one embodiment, the Compound of Formula I is administered sequentially with the SGLT2 inhibitor.

In one embodiment, the Compound of Formula I is administered in a single pharmaceutical composition with the SGLT2 inhibitor.

In one embodiment, the Compound of Formula I and the SGLT2 inhibitor are administered as separate compositions.

In one embodiments, a subject in need thereof is given 200 mg daily of 2-(4-(2-hydroxyethoxy)-3,5-dimethylphenyl)-5,7-dimethoxyquinazolin-4(3H)-one or an equivalent amount of a pharmaceutically acceptable salt thereof.

In one embodiment, a subject in need thereof is given 100 mg of 2-(4-(2-hydroxyethoxy)-3,5-dimethylphenyl)-5,7-dimethoxyquinazolin-4(3H)-one or an equivalent amount of a pharmaceutically acceptable salt thereof twice daily.

In one embodiment, the subject is a human.

In one embodiment, the subject is a human with type 2 diabetes and low HDL cholesterol (below 40 mg/dL for males and below 45 mg/dL for females) and a recent acute coronary syndrome (ACS) (preceding 7-90 days).

In one embodiment, the subject is a human with type 2 diabetes.

In one embodiment, the subject is a human with low HDL cholesterol (i.e., below 40 mg/dL for males and below 45 mg/dL for females).

In one embodiment, the subject is a human with a recent ACS (preceding 7-90 days).

In one embodiment, the subject is a human on statin therapy.

REFERENCES

Cannon, C. P., Blazing, M. A., Giugliano, R. P., et al. (2015) Ezetimibe added to statin therapy after acute coronary syndromes. N Engl J Med, 372(25), 2387-97.

Schwartz, G. G., Olsson, A. G. & Barter, P. J. (2013) Dalcetrapib in patients with an acute coronary syndrome. N Engl J Med, 368(9), 869-70.

Schwartz, G. G., Steg, P. G., Szarek, M., et al. (2018) Alirocumab and cardiovascular outcomes after acute coronary syndrome. N Engl J Med, 379(22), 2097-107.

Zinman, B., Wanner, C., Lachin, J. M., et al. (2015) Empagliflozin, cardiovascular outcomes, and mortality in type 2 diabetes. N Engl J Med, 373(22), 2117-28.

Neal B., Perkovic V., Mahaffey, K. W., et al. (2017) Canagliflozin and cardiovascular and renal events in type 2 diabetes. N Engl J Med, 377(7), 644-657.

Perkovic, V., Jardine, M. J., Neal, B., et al. (2019) Canagliflozin and renal outcomes in type 2 diabetes and nephropathy. N Engl J Med, 380(24), 2295-2306.

Guettier, J. M. (2016) Endocrinologic and Metabolic Drugs Advisory Committee (EMDAC) Meeting. U.S. Food and Drug Administration (FDA).

Rastogi, A., Bhansali, A. (2017) SGLT2 Inhibitors Through the Windows of EMPA-REG and CANVAS Trials: A Review. Diabetes Ther, 8, 1245-1251.

Carbone S., Dixon, D. L. (2019) The CANVAS Program: implications of canaglifozin on reducing cardiovascular risk in patients with type 2 diabetes mellitus. Cardiovasc Diabetol, 18(64), 1-13.

Wiviott, S. D., Raz, M. P., et al. (2019) Dapagliflozin and Cardiovascular Outcomes in Type 2 Diabetes. N Engl J Med, 380(4), 347-357.

EXAMPLES

Example 1: Clinical Development

Apabetalone (RVX-208) was evaluated in a recently completed clinical Phase 3 trial (BETonMACE; NCT02586155) for the effect on MACE in type 2 diabetes patients with low HDL cholesterol (below 40 mg/dL for males and below 45 mg/dL for females) and a recent acute coronary syndrome (ACS) (preceding 7-90 days). All patients received high intensity statin treatment as well as other evidence-based treatments.

Patients (n=2425) with ACS in the preceding 7 to 90 days, with type 2 diabetes and low HDL cholesterol (≤40 mg/dl for men, 45 mg/dl for women), receiving intensive or maximum-tolerated therapy with atorvastatin or rosuvastatin, were assigned in double-blind fashion to receive apabetalone 100 mg orally twice daily or matching placebo. Baseline characteristics include female sex (25%), myocardial infarction as index ACS event (74%), coronary revascularization for index ACS (76%), treatment with dual anti-platelet therapy (87%) and renin-angiotensin system inhibitors (91%), median LDL cholesterol 65 mg per deciliter, and median HbA1c 7.3%. The primary efficacy measure is time to first occurrence of cardiovascular death, non-fatal myocardial infarction, or stroke. Assumptions include a primary event rate of 7% per annum in the placebo group and median follow-up of 1.5 years. Patients were followed until at least 250 primary endpoint events had occurred, providing 80% power to detect a 30% reduction in the primary endpoint with apabetalone.

Example 2: Post-Hoc Analysis

In the BETonMACE clinical study, a total of N=298 patients (N=150 in apabetalone treatment group and N=148 in placebo treatment group) were administered an SGLT2 inhibitor (empagliflozin, dapagliflozin, or canagliflozin) in addition to RVX-208 with specified statin therapy (atorvastatin and rosuvastatin) and other guideline-defined treatments. Patients who were randomized and received at least one dose of SGLT2 treatment prior to the date of the first incidence of event were censored as a MACE event at the date of the confirmed event. Those patients who received at least one dose of SGLT2 treatment after the date of the first incidence of event were censored as non-MACE events and the date of last contact was used as the censoring date. For all patients who did not receive SGLT2 treatment during the study, the time to first event was calculated using randomization date and date of the confirmed event, or date of last contact for censored subjects.

The distributions of the endpoints within the apabetalone and placebo groups were compared using a two-sided log-rank test (LRT) with an alpha=0.05 level of significance. The cumulative incidence is shown as 1-KM (Kaplan-Meier) estimate for event rate.

Narrowly Defined MACE

Figure 2:
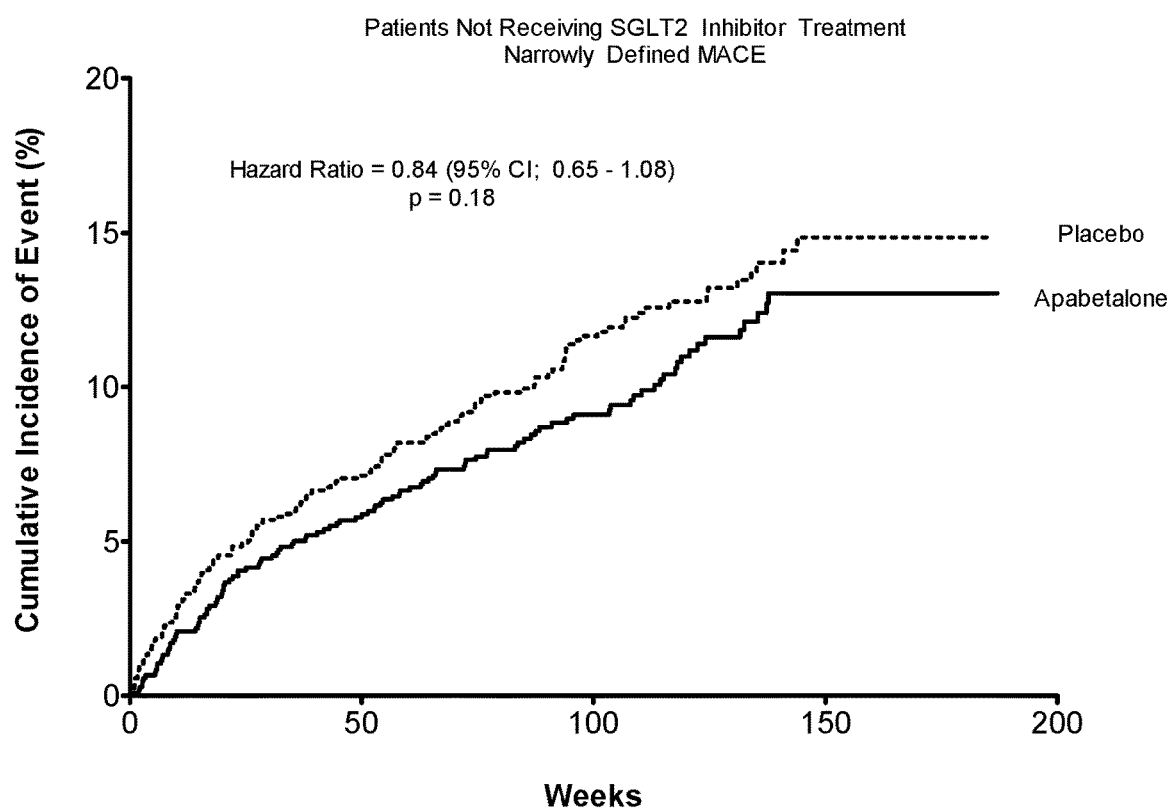
FIG. 2 depicts a comparison of the cumulative incidence of narrowly defined MACE in patients administered RVX-208 without SGLT2 inhibitors versus patients administered placebo without SGLT2 inhibitors.
Figure 3:
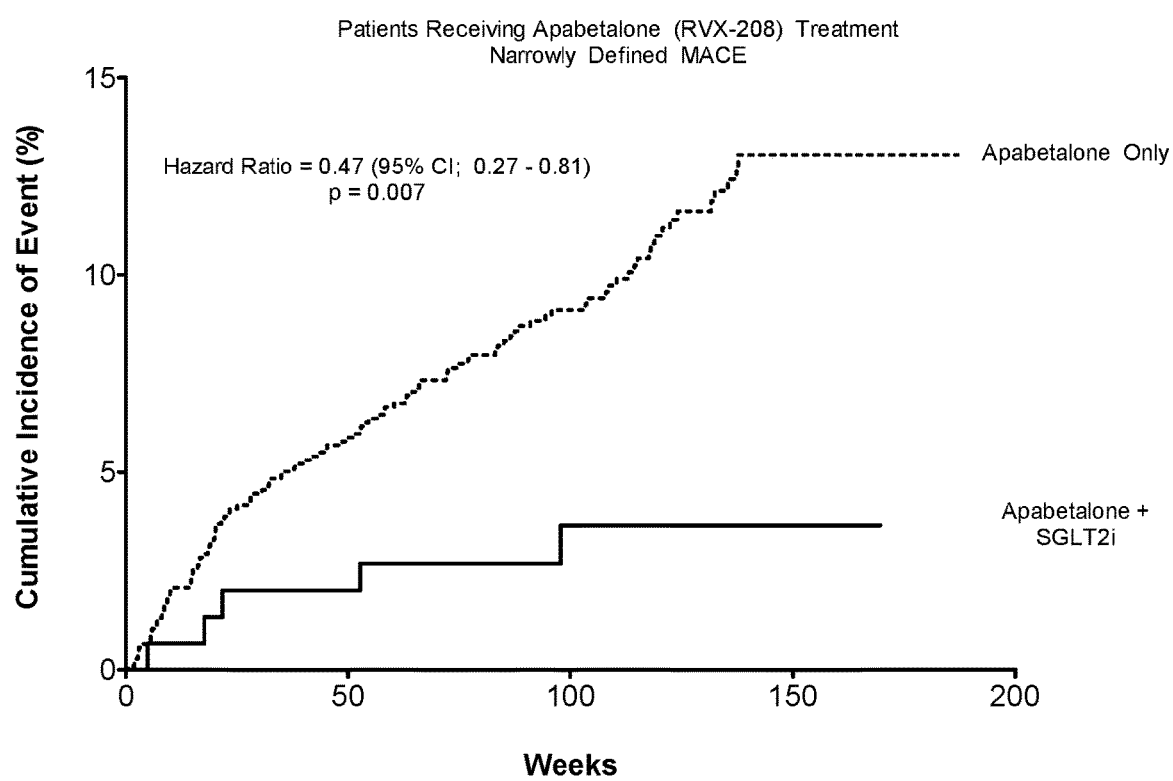
FIG. 3 depicts a comparison of the cumulative incidence of narrowly defined MACE in patients administered RVX-208 with SGLT2 inhibitors versus patients administered RVX-208 without SGLT2 inhibitors.

FIGS. 1-3 each compare the cumulative incidence of narrowly defined MACE (i.e., as a single composite endpoint of multiple primary end points defined as cardiovascular death, non-fatal myocardial infarction, or stroke) between two groups of patients, a test group and a control group, which are described as follows:
 i. patients treated with a SGLT2 inhibitor and apabetalone (test) and patients treated with a SGLT2 inhibitor and received a placebo (control) (FIG. 1);
 ii. patients not treated with a SGLT2 inhibitor but treated with apabetalone (test) and patients not treated with SGLT2 inhibitor but received placebo (control) (FIG. 2); and
 iii. patients treated with apabetalone and a SGLT2 inhibitor (test) and patients treated apabetalone only (control) (FIG. 3).

In FIG. 1, where the patients were treated with SGLT2 inhibitors and received either apabetalone or a placebo, there were a total of 18 primary end points: 5 (3.3%) in the apabetalone group and 13 (8.9%) in the placebo group, representing a Kaplan-Meier estimated event rate of 2.7% in the apabetalone group and 5.4% in the placebo group at 18 months. This means that at 18 months, patients treated with only the SGLT2 inhibitor had an estimated narrowly defined MACE event rate at 5.4% but when patients were treated with the combination of apabetalone and a SGLT2 inhibitor, the estimated narrowly defined MACE event rate was halved at 2.7%. As depicted in FIG. 1, combining apabetalone with an SGLT2 inhibitor significantly reduced the composite end point of narrowly defined MACE compared to treatment with the SGLT2 inhibitor alone, specifically by reducing the number of patients having a narrowly defined MACE event at any given time by 60% (Hazard Ratio [HR], 0.40; 95% CI, 0.16-1.00; P=0.05).

In FIG. 2, where the patients were not treated with a SGLT2 inhibitor but received either apabetalone or a placebo, there were a total of 214 primary end points: 111 (10.5%) in the apabetalone group and 130 (12.3%) in the placebo group, representing a Kaplan-Meier estimated event rate of 8.0% in the apabetalone group and 9.8% in the placebo group at 18 months. This means that at 18 months, patients treated with only apabetalone had an estimated narrowly defined MACE event rate of 10.5% while patients that were not treated with apabetalone or an SGLT2 inhibitor had an estimated narrowly defined MACE event rate of 12.3%. As depicted in FIG. 2, apabetalone monotherapy slightly reduced the composite end point of narrowly defined MACE compared to non-treatment, specifically by reducing the number of patients having a narrowly defined MACE event at any given time by 16% (Hazard Ratio [HR], 0.84; 95% CI, 0.65-1.08; P=0.18).

As depicted in FIG. 3, patients treated with the combination of apabetalone and a SGLT2 inhibitor, when compared to patients treated with apabetalone alone, exhibited a significant hazard ratio of 0.47 (95% CI, 0.27-0.81; P=0.007) for the composite end point of narrowly defined MACE. This means that the combination of apabetalone and a SGLT2 inhibitor reduced the number of patients having a narrowly defined MACE event at any given time by 53%, compared to treatment with apabetalone alone.

In conclusion, apabetalone monotherapy was able to reduce the number of patients having a narrowly defined MACE event at any given time by 16% compared to non-treatment (see FIG. 2). Thus, it was unexpected that a combination therapy of apabetalone and SGLT2 results in a significant reduction of the number of patients having a narrowly defined MACE event at any given time by 60% compared to SGLT2 monotherapy.

Broadly Defined MACE

Figure 4:
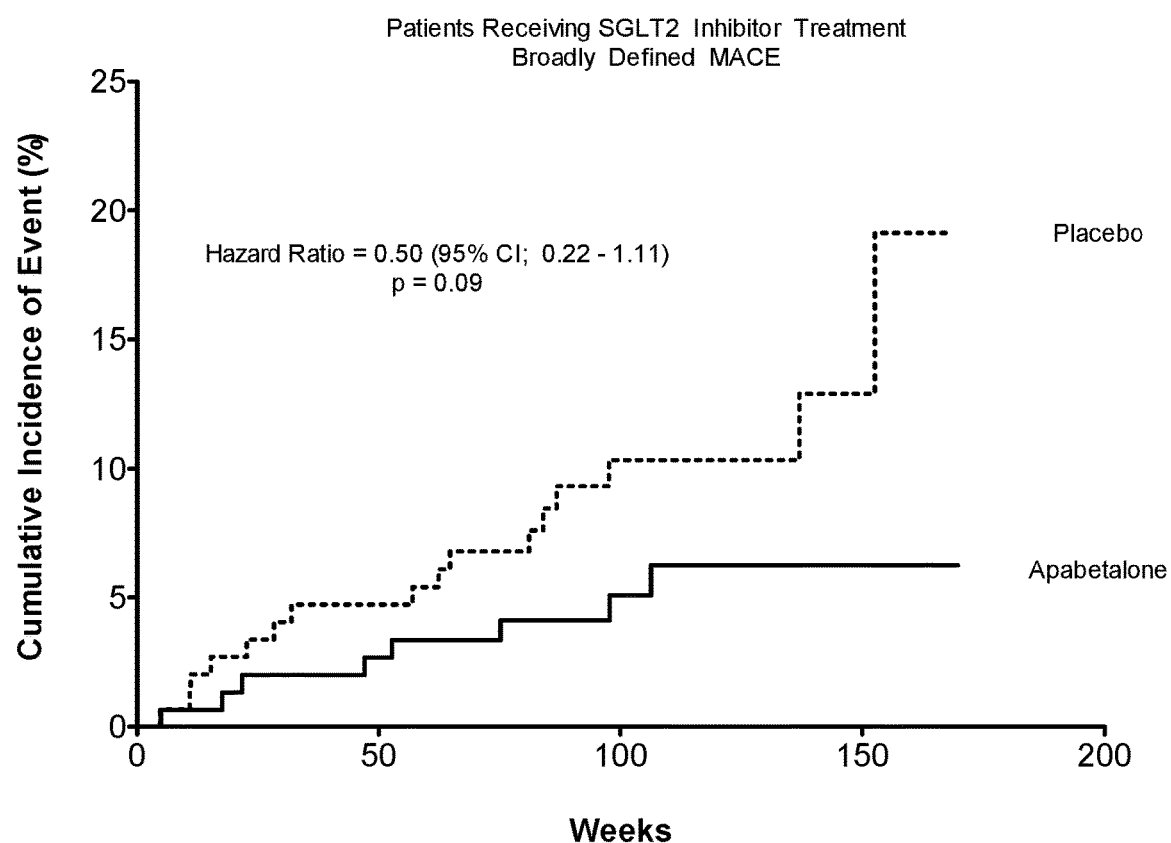
FIG. 4 depicts a comparison of the cumulative incidence of broadly defined MACE in patients administered RVX-208 with SGLT2 inhibitors versus patients administered placebo with SGLT2 inhibitors.
Figure 5:
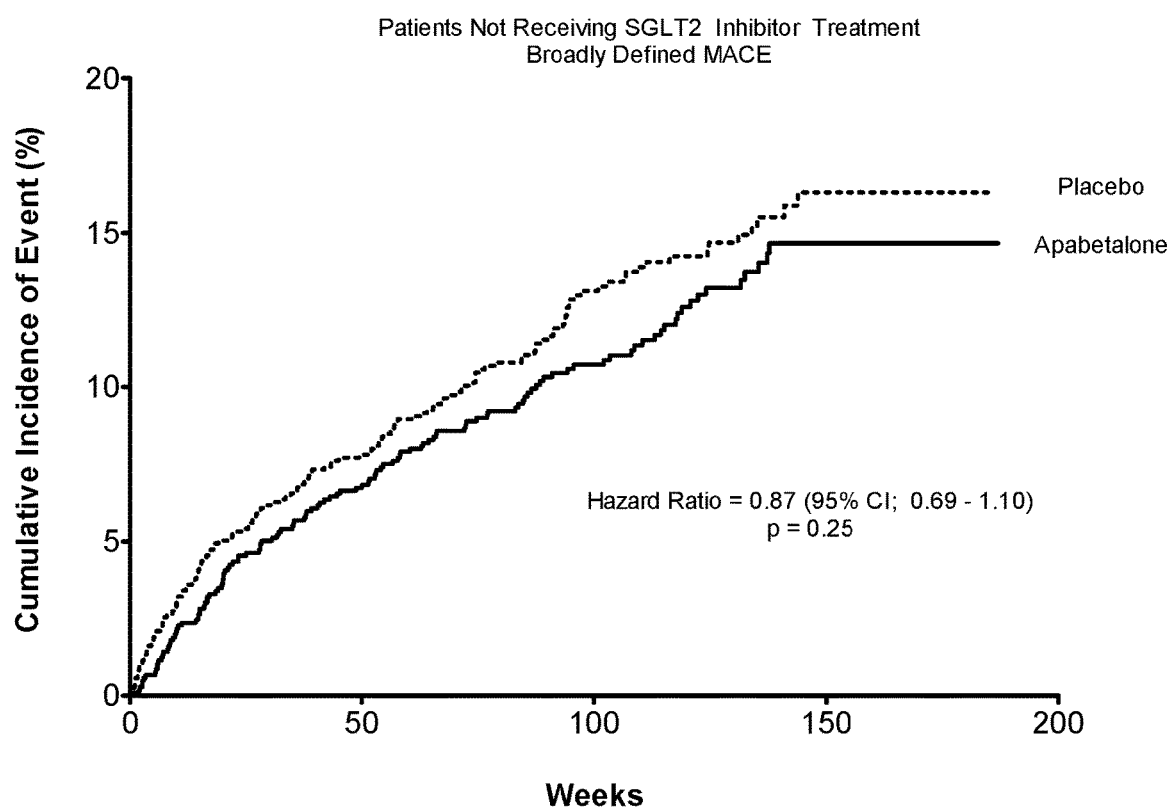
FIG. 5 depicts a comparison of the cumulative incidence of broadly defined MACE in patients administered RVX-208 without SGLT2 inhibitors versus patients administered placebo without SGLT2 inhibitors.
Figure 6:
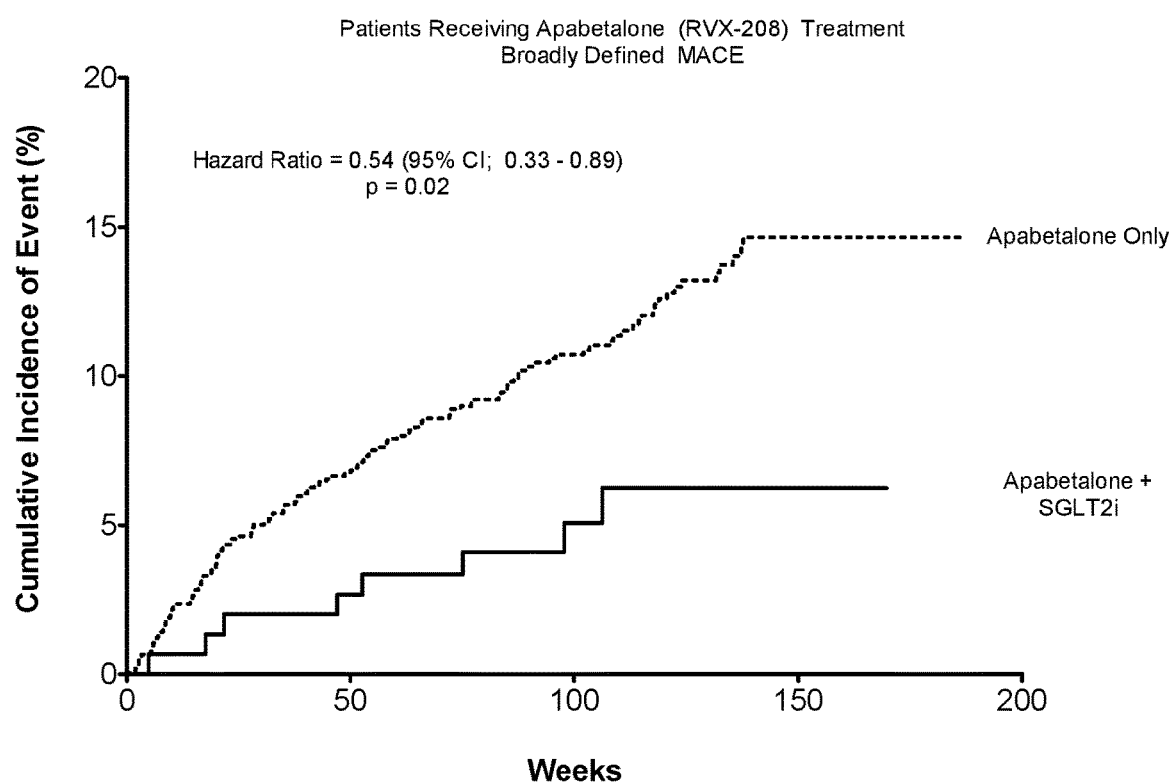
FIG. 6 depicts a comparison of the cumulative incidence of broadly defined MACE in patients administered RVX-208 with SGLT2 inhibitors versus patients administered RVX-208 without SGLT2 inhibitors.

FIGS. 4-6 each compare the cumulative incidence of broadly defined MACE (i.e., as a single composite endpoint of multiple primary end points defined as cardiovascular death, non-fatal myocardial infarction, stroke, or hospitalization for cardiovascular diseases (CVD)) between the same two groups of patients as described above for FIGS. 1-3.

In FIG. 4, where the patients were treated with SGLT2 inhibitors and received either apabetalone or a placebo, it can be seen that combining apabetalone with an SGLT2 inhibitor reduced the composite end point of broadly defined MACE compared to treatment with the SGLT2 inhibitor alone (with trending statistical significance), specifically by reducing the number of patients having a broadly defined MACE event at any given time by 50% (Hazard Ratio [HR], 0.50; 95% CI, 0.22-1.11; P=0.09).

In FIG. 5, where the patients were not treated with a SGLT2 inhibitor but received either apabetalone or a placebo, it can be seen that apabetalone monotherapy slightly reduced the composite end point of broadly defined MACE compared to non-treatment, specifically by reducing the number of patients having a broadly defined MACE event at any given time by 13% (Hazard Ratio [HR], 0.87; 95% CI, 0.69-1.10; P=0.25).

As depicted in FIG. 6, patients treated with the combination of apabetalone and a SGLT2 inhibitor, when compared to patients treated with apabetalone alone, exhibited a significant hazard ratio of 0.54 (95% CI, 0.33-0.89; P=0.02) for the composite end point of broadly defined MACE. This means that the combination of apabetalone and a SGLT2 inhibitor reduced the number of patients having a broadly defined MACE event at any given time by 46%, compared to treatment with apabetalone alone.

In conclusion, in view of the modest ability of although apabetalone monotherapy modestly to reduce the number of patients having a broadly defined MACE event at any given time by 13% compared to non-treatment (see FIG. 5), it was surprising and unexpected that the combination therapy of apabetalone and SGLT2 significantly reduces the number of patients having a broadly defined MACE event at any given time by 50% compared to SGLT2 monotherapy.

Non-Fatal Myocardial Infarction

Figure 7:
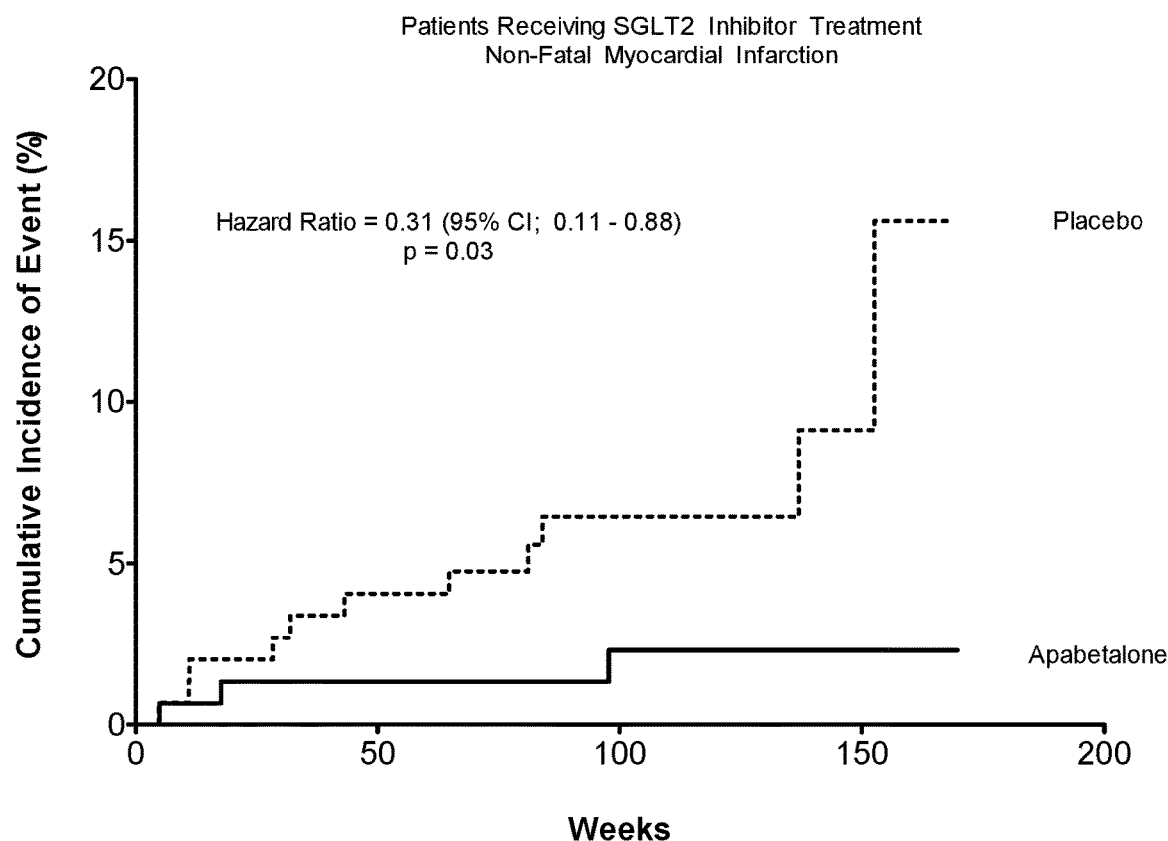
FIG. 7 depicts a comparison of the cumulative incidence of non-fatal myocardial infarction in patients administered RVX-208 with SGLT2 inhibitors versus patients administered placebo with SGLT2 inhibitors.
Figure 8:
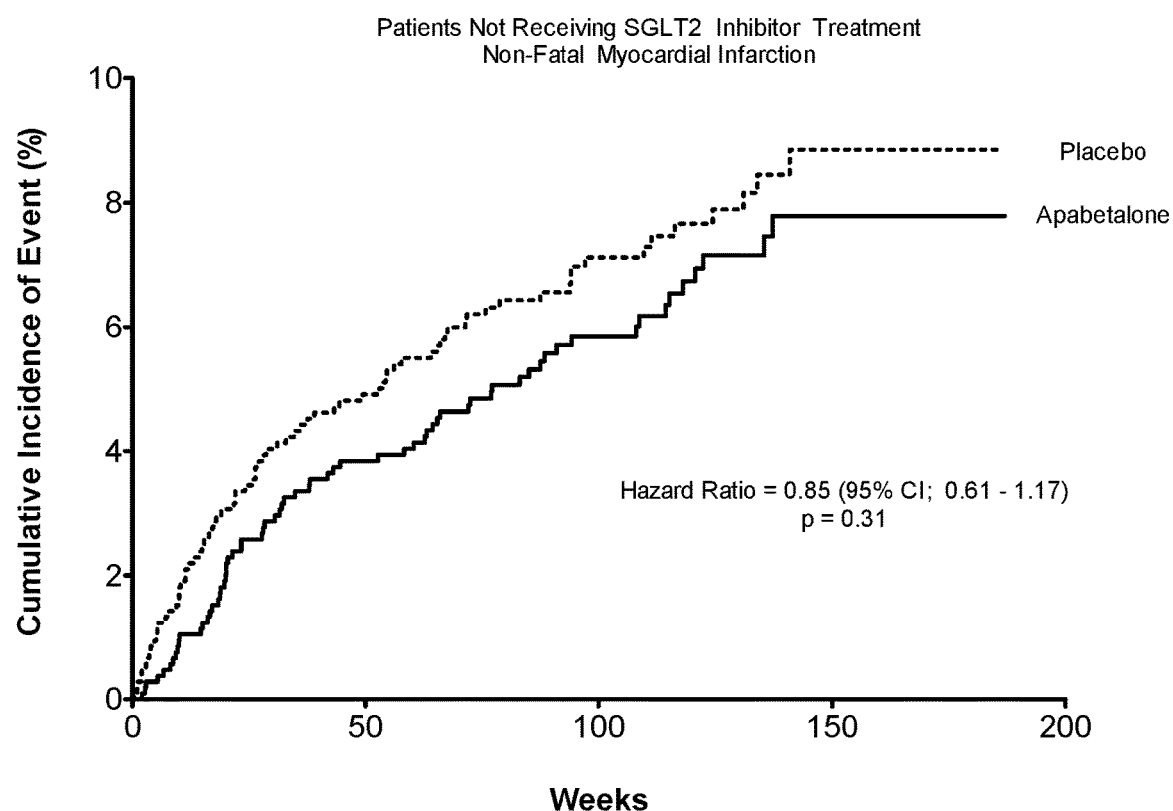
FIG. 8 depicts a comparison of the cumulative incidence of non-fatal myocardial infarction in patients administered RVX-208 without SGLT2 inhibitors versus patients administered placebo without SGLT2 inhibitors.
Figure 9:
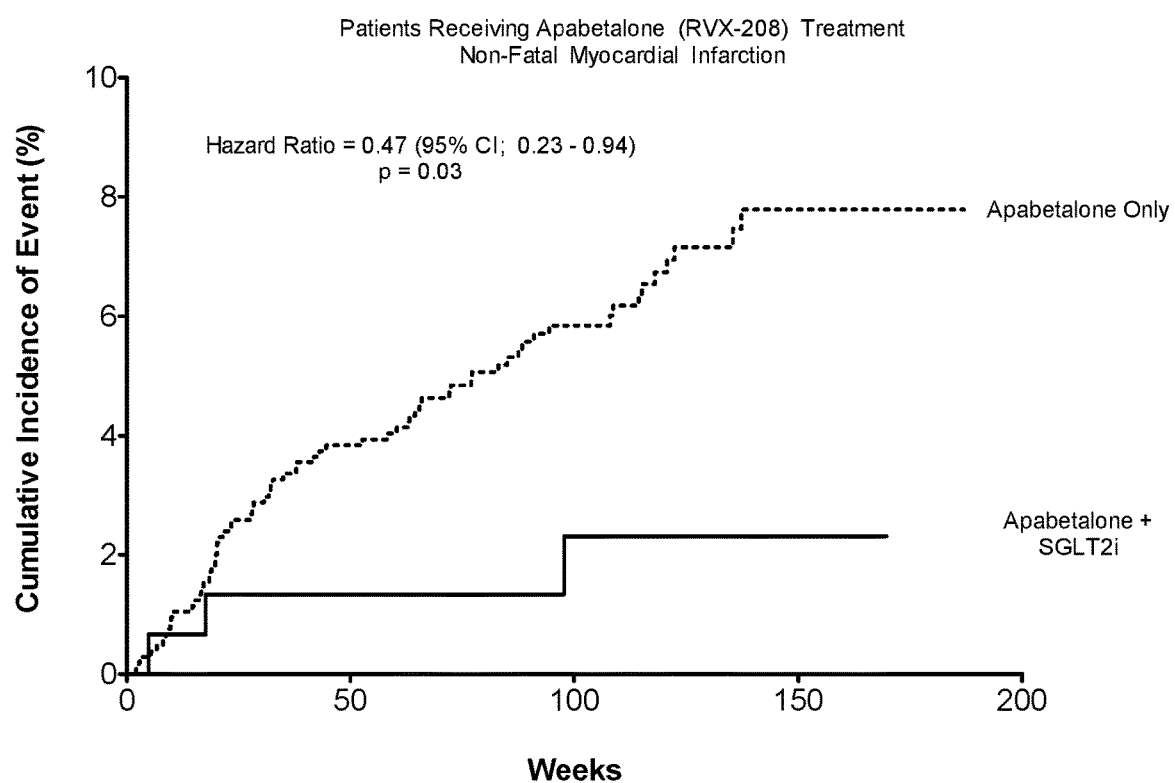
FIG. 9 depicts a comparison of the cumulative incidence of non-fatal myocardial infarction in patients administered RVX-208 with SGLT2 inhibitors versus patients administered RVX-208 without SGLT2 inhibitors.

FIGS. 7-9 each compare the cumulative incidence of non-fatal myocardial infarction between the same two groups of patients as described above for FIGS. 1-3.

In FIG. 7, where the patients were treated with SGLT2 inhibitors and received either apabetalone or a placebo, it can be seen that combining apabetalone with an SGLT2 inhibitor significantly reduced for the end point of non-fatal myocardial infarction compared to treatment with the SGLT2 inhibitor alone, specifically by reducing the number of patients having a non-fatal myocardial infarction event at any given time by 69% (Hazard Ratio [HR], 0.31; 95% CI, 0.11-0.88; P=0.03).

In FIG. 8, where the patients were not treated with a SGLT2 inhibitor but received either apabetalone or a placebo, it can be seen that apabetalone monotherapy reduced the end point of non-fatal myocardial infarction compared to non-treatment, specifically by reducing the number of patients having a non-fatal myocardial infarction event at any given time by 15% (Hazard Ratio [HR], 0.85; 95% CI, 0.61-1.17; P=0.31).

As depicted in FIG. 9, patients treated with the combination of apabetalone and a SGLT2 inhibitor, when compared to patients treated with apabetalone alone, exhibited a significant hazard ratio of 0.47 (95% CI, 0.33-0.89; P=0.03) for the end point of non-fatal myocardial infarction. This means that the combination of apabetalone and a SGLT2 inhibitor reduced the number of patients having a non-fatal myocardial infarction event at any given time by 53%, compared to treatment with apabetalone alone.

In conclusion, given that apabetalone monotherapy reduced the number of patients having a non-fatal myocardial infarction event at any given time by a modest 15% compared to non-treatment (see FIG. 8), it was therefore unexpected that the combination therapy of apabetalone and SGLT2 significantly reduces the number of patients having a non-fatal myocardial infarction event at any given time by 69% compared to SGLT2 monotherapy.

Cardiovascular Death

Figure 10:
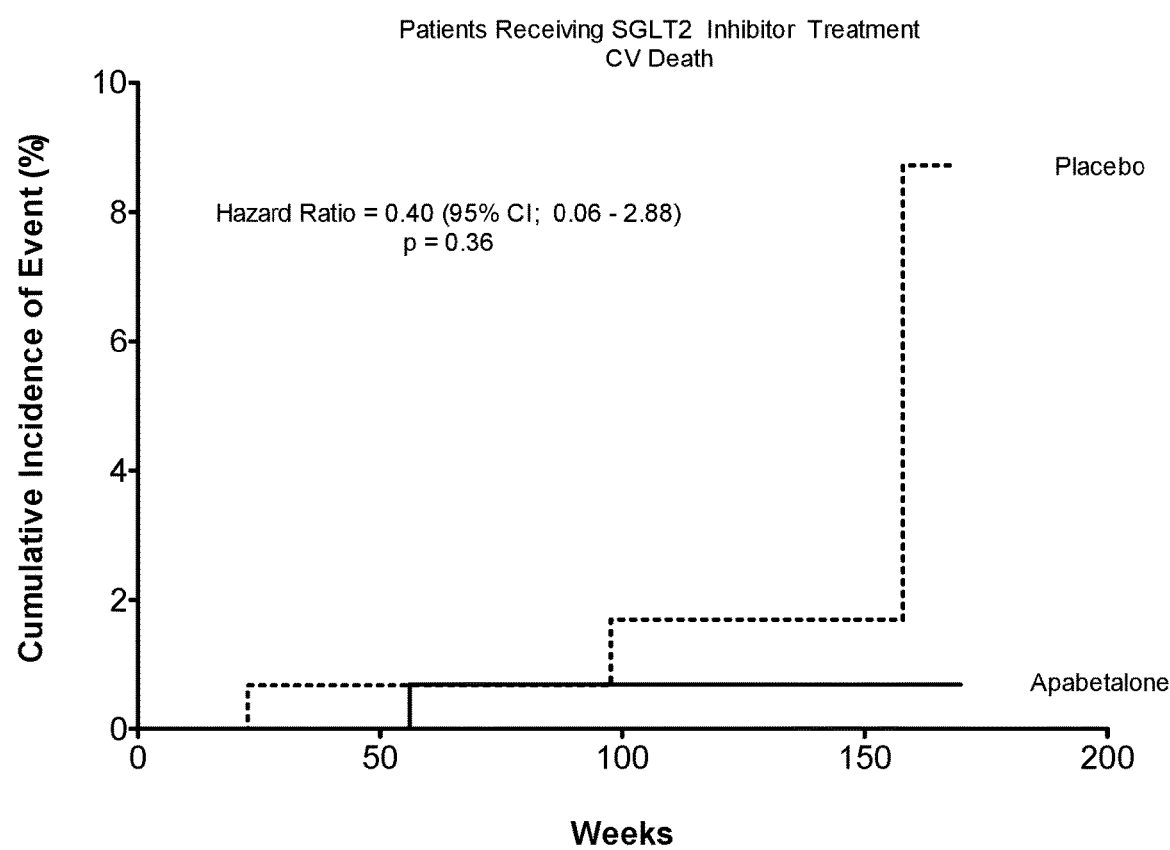
FIG. 10 depicts a comparison of the cumulative incidence of CV deaths in patients administered RVX-208 with SGLT2 inhibitors versus patients administered placebo with SGLT2 inhibitors.
Figure 11:
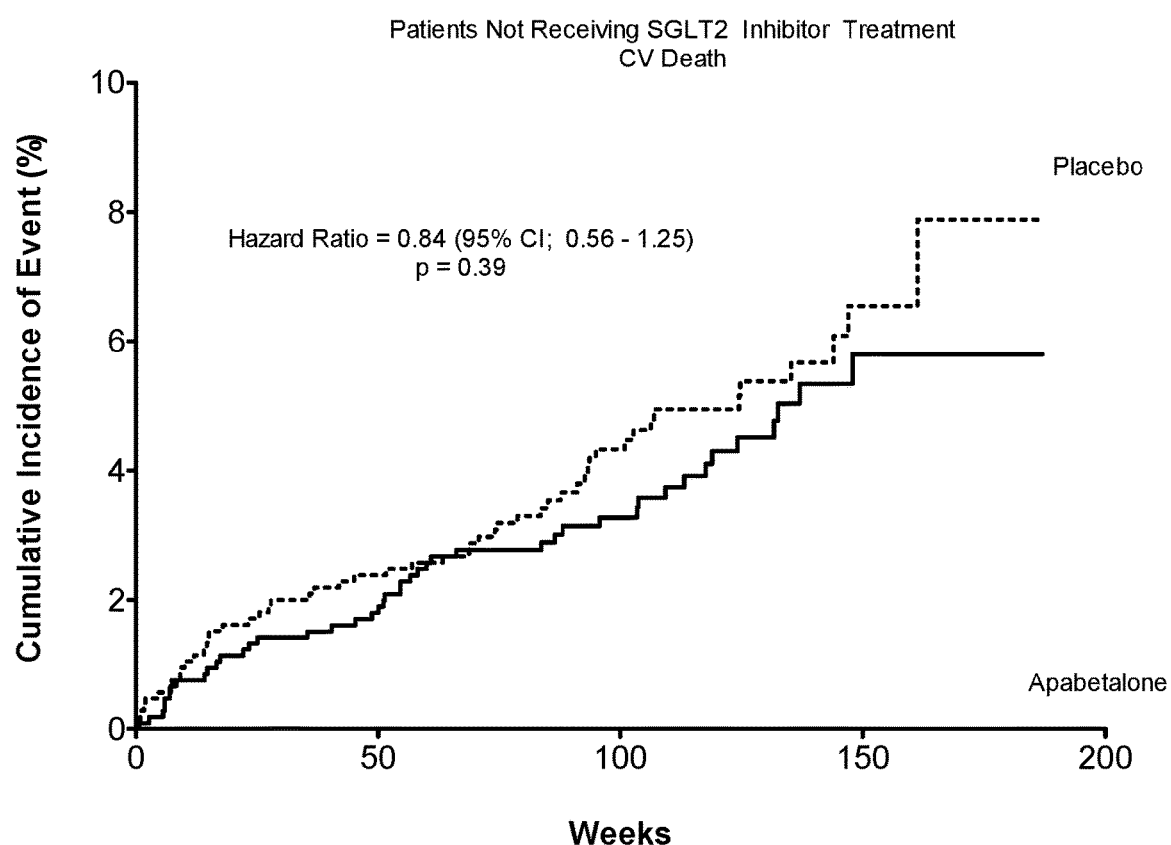
FIG. 11 depicts a comparison of the cumulative incidence of CV deaths in patients administered RVX-208 without SGLT2 inhibitors versus patients administered placebo without SGLT2 inhibitors.
Figure 12:
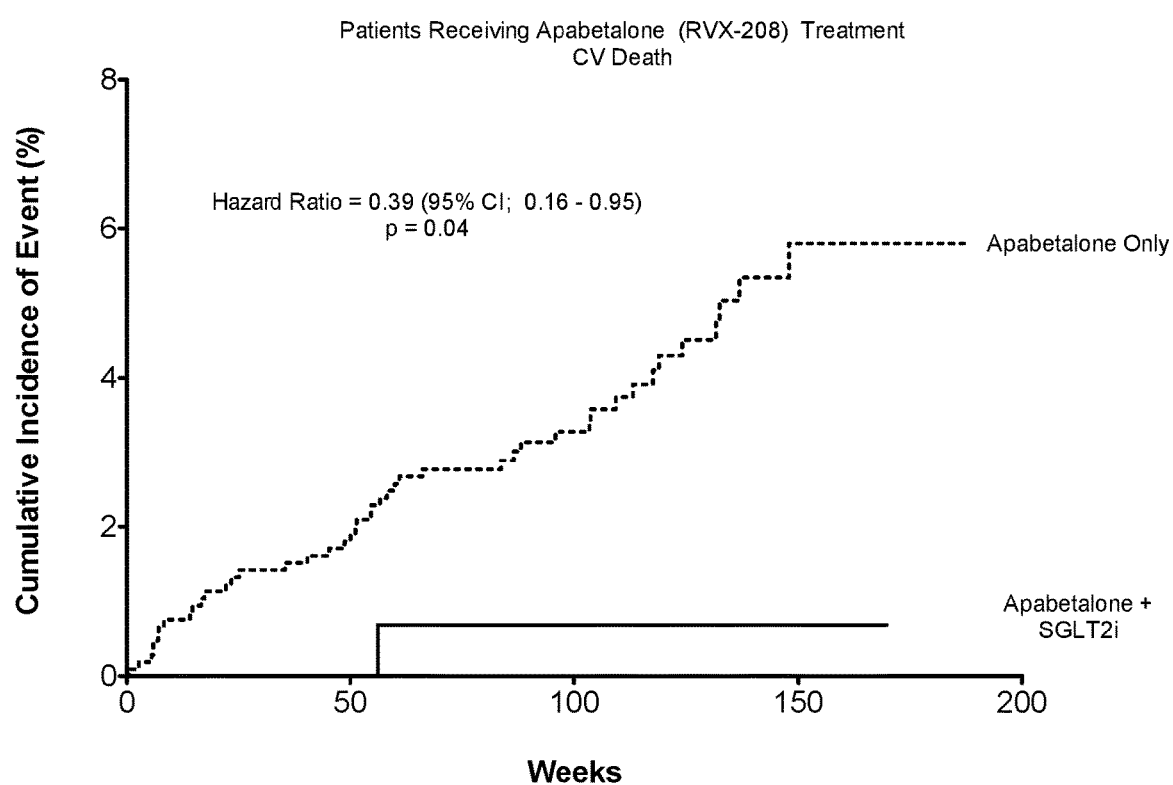
FIG. 12 depicts a comparison of the cumulative incidence of CV deaths in patients administered RVX-208 with SGLT2 inhibitors versus RVX-208 without SGLT2 inhibitors.

FIGS. 10-12 each compare the cumulative incidence of cardiovascular death between the same two groups of patients as described above for FIGS. 1-3.

In FIG. 10, where the patients were treated with SGLT2 inhibitors and received either apabetalone or a placebo, it can be seen that combining apabetalone with an SGLT2 inhibitor significantly reduced the end point of cardiovascular death compared to treatment with the SGLT2 inhibitor alone, specifically by reducing the number of patients having a cardiovascular death event at any given time by 60% (Hazard Ratio [HR], 0.40; 95% CI, 0.06-2.88; P=0.36).

In FIG. 11, where the patients were not treated with a SGLT2 inhibitor but received either apabetalone or a placebo, it can be seen that apabetalone monotherapy reduced the end point of cardiovascular death compared to non-treatment, specifically by reducing the number of patients having a cardiovascular death event at any given time by 16% (Hazard Ratio [HR], 0.84; 95% CI, 0.56-1.25; P=0.39).

As depicted in FIG. 12, patients treated with the combination of apabetalone and a SGLT2 inhibitor, when compared to patients treated with apabetalone alone, exhibited a significant hazard ratio of 0.39 (95% CI, 0.16-0.95; P=0.04) for the end point of cardiovascular death. This means that the combination of apabetalone and a SGLT2 inhibitor reduces the number of patients having a cardiovascular death event at any given time by 61%, compared to treatment with apabetalone alone.

In conclusion, given that apabetalone monotherapy reduced the number of patients having a cardiovascular death event at any given time by a modest 16% compared to patients receiving only the placebo (see FIG. 11), it was unexpected that the combination therapy of apabetalone and SGLT2 would result in a significant reduction in the number of patients having a non-fatal myocardial infarction event at any given time by 60% compared to SGLT2 monotherapy.

Hospitalization for Cardiovascular Diseases

Figure 13:
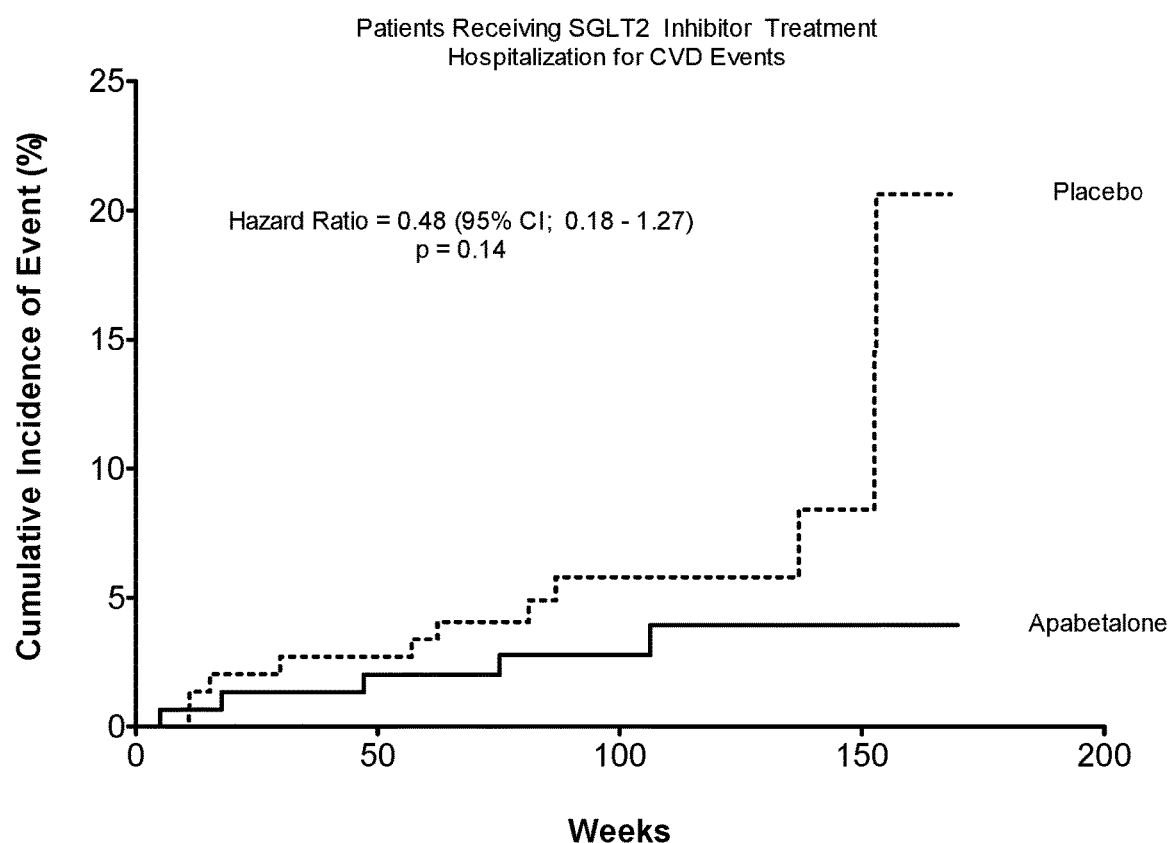
FIG. 13 depicts a comparison of the cumulative incidence of hospitalization for CVD events in patients administered RVX-208 with SGLT2 inhibitors versus patients administered placebo with SGLT2 inhibitors.
Figure 14:
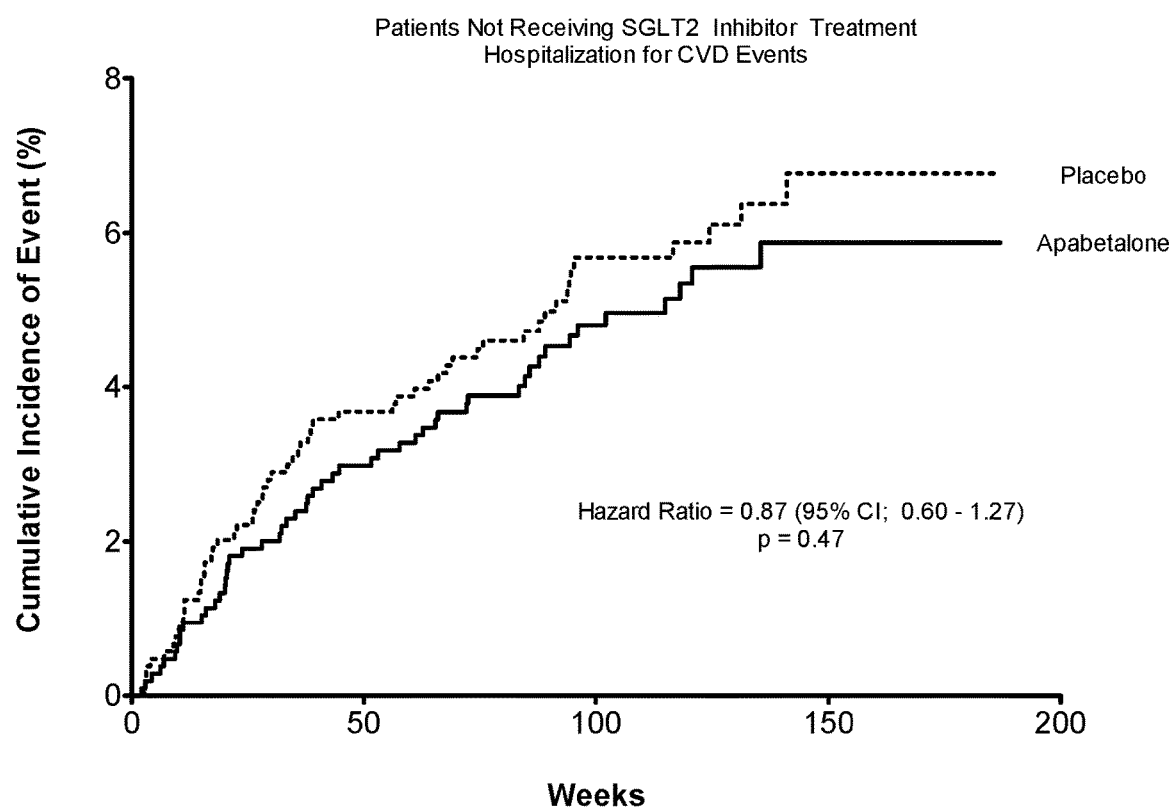
FIG. 14 depicts a comparison of the cumulative incidence of hospitalization for CVD events in patients administered RVX-208 without SGLT2 inhibitors versus patients administered placebo without SGLT2 inhibitors.
Figure 15:
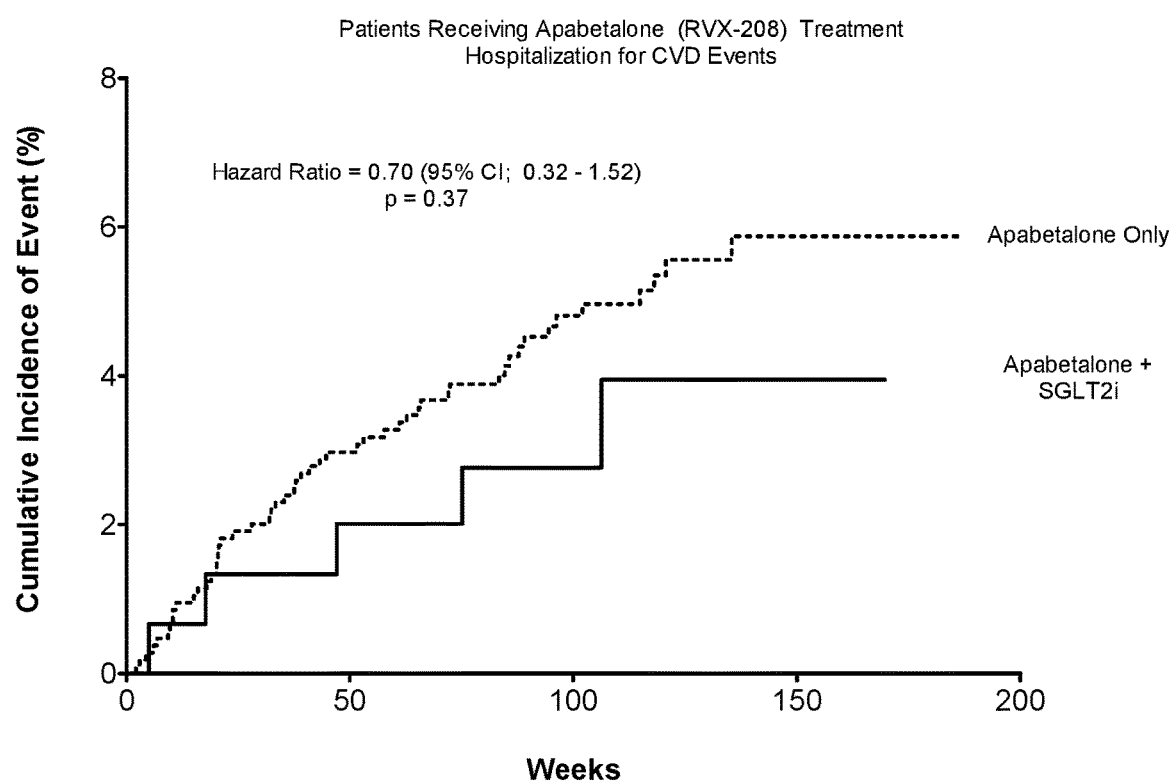
FIG. 15 depicts a comparison of the cumulative incidence of hospitalization for CVD events in patients administered RVX-208 with SGLT2 inhibitors versus patients administered RVX-208 without SGLT2 inhibitors.

FIGS. 13-15 each compare the cumulative incidence of hospitalization for cardiovascular diseases between the same two groups of patients as described above for FIGS. 1-3.

In FIG. 13, where the patients were treated with SGLT2 inhibitors and received either apabetalone or a placebo, it can be seen that combining apabetalone with a SGLT2 inhibitor significantly reduced the end point of hospitalization for cardiovascular diseases compared to treatment with the SGLT2 inhibitor alone, specifically by reducing the number of patients having a hospitalization for cardiovascular diseases event at any given time by 52% (Hazard Ratio [HR], 0.48; 95% CI, 0.18-1.27; P=0.14).

In FIG. 14, where the patients were not treated with a SGLT2 inhibitor but received either apabetalone or a placebo, it can be seen that apabetalone monotherapy slightly reduced the end point of hospitalization for cardiovascular diseases compared to non-treatment, specifically by reducing the number of patients having a hospitalization for cardiovascular diseases event at any given time by 13% (Hazard Ratio [HR], 0.87; 95% CI, 0.60-1.27; P=0.47), As depicted in FIG. 15, patients treated with the combination of apabetalone and a SGLT2 inhibitor, when compared to patients treated with apabetalone alone, exhibited a significant hazard ratio of 0.70 (95% CI, 0.32-1.52; P=0.37) for the end point of hospitalization for cardiovascular diseases. This means that the combination of apabetalone and a SGLT2 inhibitor reduced the number of patients having a hospitalization for cardiovascular diseases event at any given time by 30%, compared to treatment with apabetalone alone.

In conclusion, given that apabetalone monotherapy reduces the number of patients having a hospitalization for cardiovascular diseases event at any given time by 13% compared to non-treatment (see FIG. 14), it was therefore unexpected that the combination therapy of apabetalone and SGLT2 would significantly reduce the number of patients having a hospitalization for cardiovascular diseases event at any given time by 52% compared to SGLT2 monotherapy.

Hospitalization for Congestive Heart Failure

Figure 16:
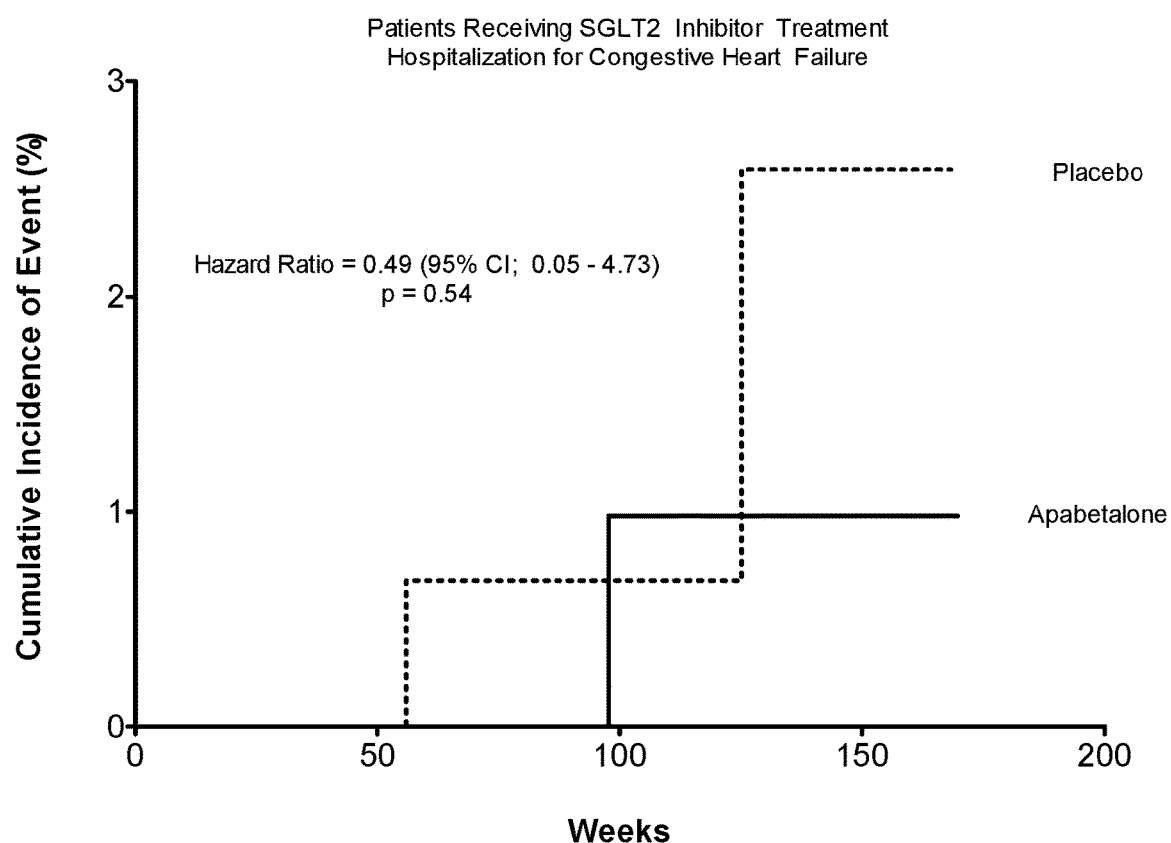
FIG. 16 depicts a comparison of the cumulative incidence of hospitalization for congestive heart failure in patients administered RVX-208 with SGLT2 inhibitors versus patients administered placebo with SGLT2 inhibitors.
Figure 17:
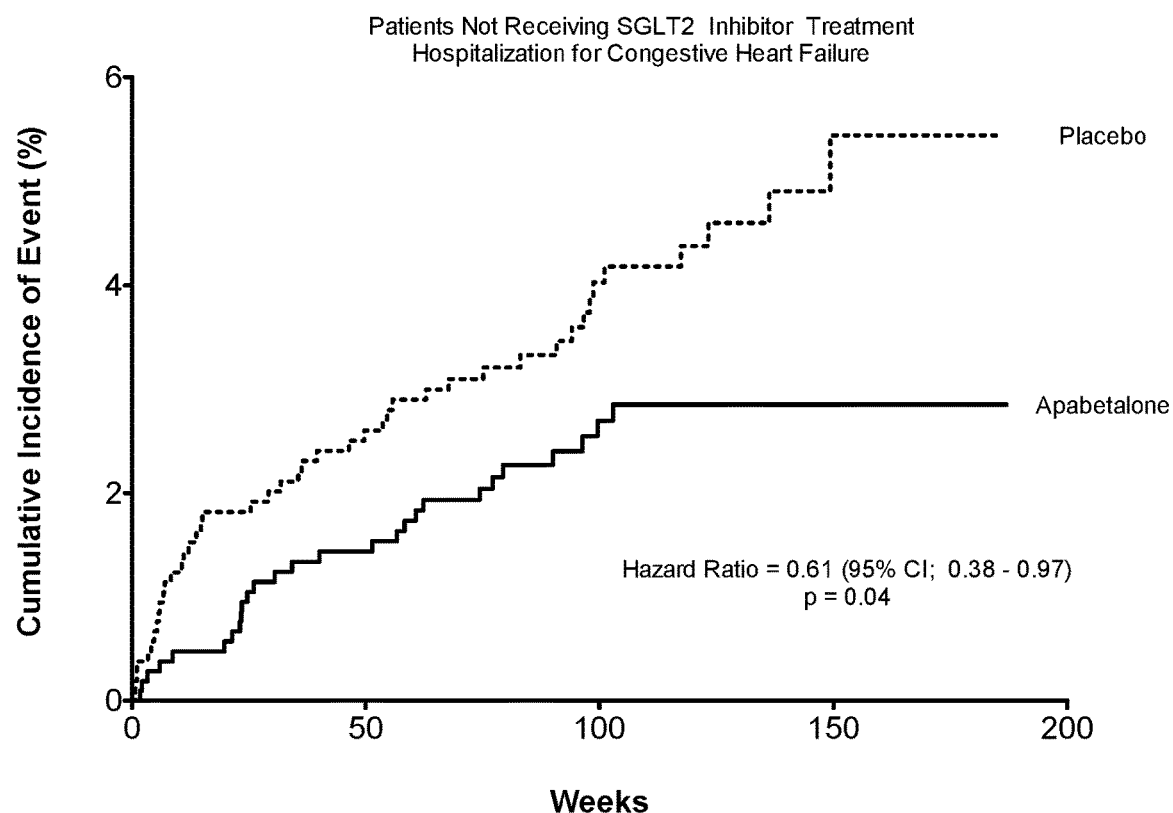
FIG. 17 depicts a comparison of the cumulative incidence of hospitalization for congestive heart failure in patients administered RVX-208 without SGLT2 inhibitors versus patients administered placebo without SGLT2 inhibitors.
Figure 18:
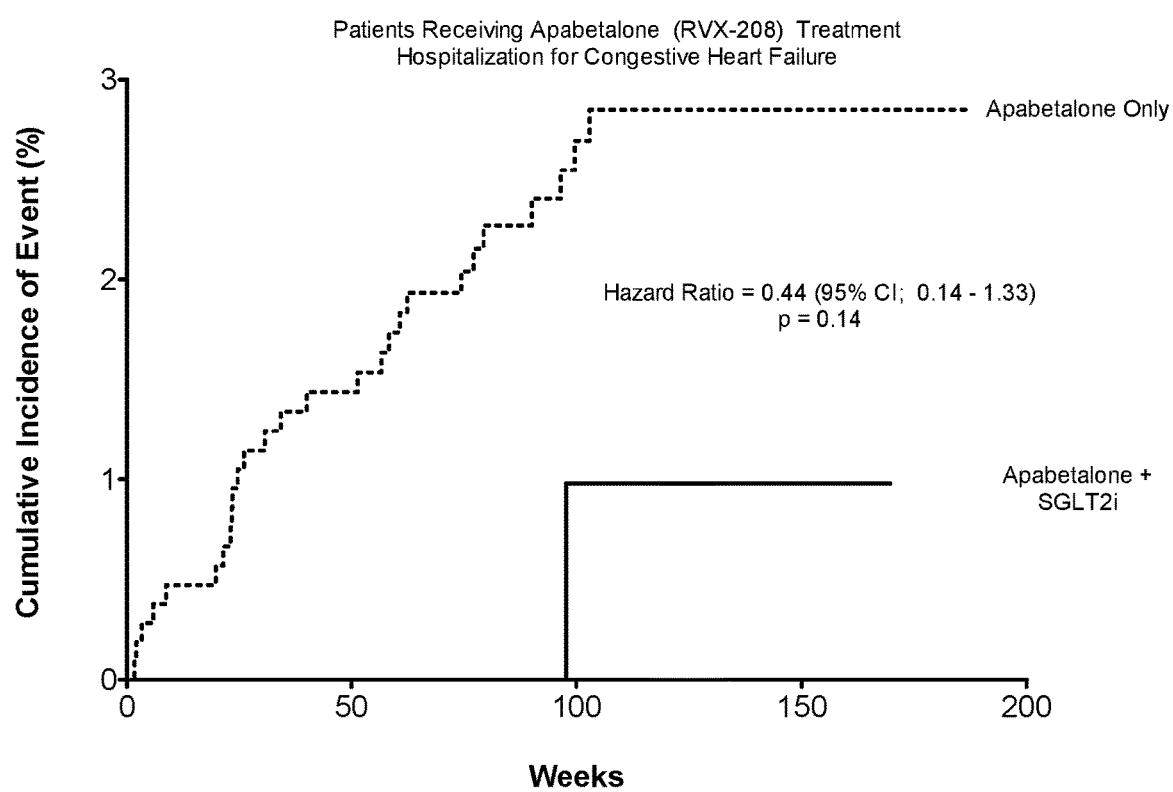
FIG. 18 depicts a comparison of the cumulative incidence of hospitalization for congestive heart failure in patients administered RVX-208 with SGLT2 inhibitors versus patients administered RVX-208 without SGLT2 inhibitors.

FIGS. 16-18 each compare the cumulative incidence of hospitalization for congestive heart failure between the same two groups of patients as described above for FIGS. 1-3.

In FIG. 16, where the patients were treated with SGLT2 inhibitors and received either apabetalone or a placebo, it can be seen that combining apabetalone with an SGLT2 inhibitor significantly reduced the end point of hospitalization for congestive heart failure compared to treatment with the SGLT2 inhibitor alone, specifically by reducing the number of patients having a hospitalization for congestive heart failure event at any given time by 51% (Hazard Ratio [HR], 0.49; 95% CI, 0.05-4.73; P=0.54).

In FIG. 17, where the patients were not treated with a SGLT2 inhibitor but received either apabetalone or a placebo, it can be seen that apabetalone monotherapy reduced the end point of hospitalization for congestive heart failure compared to non-treatment, specifically by reducing the number of patients having a hospitalization for congestive heart failure event at any given time by 39% (Hazard Ratio [HR], 0.61; 95% CI, 0.38-0.97; P=0.04), As depicted in FIG. 18, patients treated with the combination of apabetalone and a SGLT2 inhibitor, when compared to patients treated with apabetalone alone, exhibited a hazard ratio of 0.44 (95% CI, 0.14-1.33; P=0.14) for the end point of hospitalization for congestive heart failure. This means that the combination of apabetalone and a SGLT2 inhibitor reduced the number of patients having a hospitalization for congestive heart failure event at any given time by 56%, compared to treatment with apabetalone alone.

In conclusion, given that apabetalone monotherapy was able to only reduce the number of patients having a hospitalization for congestive heart failure event at any given time by 39% compared to patients receiving only the placebo (see FIG. 17), it was therefore unexpected that the combination therapy of apabetalone and SGLT2 would be capable of significantly reducing the number of patients having a hospitalization for congestive heart failure event at any given time by 51% compared to SGLT2 monotherapy.

The invention claimed is:

1. A method for treating major adverse cardiovascular events (MACE) comprising administering to a subject in need thereof a sodium-glucose transport protein 2 (SGLT2) inhibitor and a compound 2-(4-(2-hydroxyethoxy)-3,5-dimethylphenyl)-5,7-dimethoxyquinazolin-4 (3H)-one or a stereoisomer, tautomer, pharmaceutically acceptable salt, or hydrate thereof; wherein the subject is a human on statin therapy with type 2 diabetes and low HDL cholesterol, below 40 mg/dL for males and below 45 mg/dL for females, and a recent acute coronary syndrome (ACS) within the preceding 7-90 days; and wherein the SGLT2 inhibitor is selected from empagliflozin, canagliflozin, remogliflozin, ipragliflozin, HM41322, dapagliflozin, bexagliflozin, ertugliflozin, sotagliflozin, luseogliflozin, tofogliflozin.

2. A method for treating any individual component of major adverse cardiovascular events (MACE) comprising administering to a subject in need thereof a sodium-glucose transport protein 2 (SGLT2) inhibitor and a compound 2-(4-(2-hydroxyethoxy)-3,5-dimethylphenyl)-5,7-dimethoxyquinazolin-4(3H)-one or a stereoisomer, tautomer, pharmaceutically acceptable salt, or hydrate thereof, wherein the subject is a human on statin therapy with type 2 diabetes and low HDL cholesterol, below 40 mg/dL for males and below 45 mg/dL for females, and a recent acute coronary syndrome (ACS) within the preceding 7-90 days; and wherein the SGLT2 inhibitor is selected from empagliflozin, canagliflozin, remogliflozin, ipragliflozin, HM41322, dapagliflozin, bexagliflozin, ertugliflozin, sotagliflozin, luseogliflozin, tofogliflozin.

3. The method according to claim 1, wherein the subject in need thereof is administered a daily dose of 200 mg of 2-(4-(2-hydroxyethoxy)-3,5-dimethylphenyl)-5,7-dimethoxyquinazolin-4(3H)-one or an equivalent amount of a pharmaceutically acceptable salt thereof.

4. The method according to claim 1, wherein the subject in need thereof is administered 100 mg of 2-(4-(2-hydroxyethoxy)-3,5-dimethylphenyl)-5,7-dimethoxyquinazolin-4(3H)-one or an equivalent amount of a pharmaceutically acceptable salt thereof twice daily.

5. The method according to claim 1, wherein the SGLT2 inhibitor is selected from empagliflozin, canagliflozin, remogliflozin, ipragliflozin, HM41322, and dapagliflozin.

6. The method according to claim 1, wherein the SGLT2 inhibitor is selected from bexagliflozin, ertugliflozin, sotagliflozin, luseogliflozin, and tofogliflozin.

7. The method according to claim 1, wherein the MACE is selected from non-fatal myocardial infarction, cardiovascular death, stroke, and hospitalization for cardiovascular disease events.

8. The method according to claim 7, wherein the hospitalization for cardiovascular disease events is hospitalization for congestive heart failure.

9. The method according to claim 7, wherein the MACE is selected from non-fatal myocardial infarction, cardiovascular death, and stroke.

10. The method according to claim 2, wherein the subject in need thereof is administered a daily dose of 200 mg of 2-(4-(2-hydroxyethoxy)-3,5-dimethylphenyl)-5,7-dimethoxyquinazolin-4(3H)-one or an equivalent amount of a pharmaceutically acceptable salt thereof.

11. The method according to claim 2, wherein the subject in need thereof is administered 100 mg of 2-(4-(2-hydroxyethoxy)-3,5-dimethylphenyl)-5,7-dimethoxyquinazolin-4(3H)-one or an equivalent amount of a pharmaceutically acceptable salt thereof twice daily.

12. The method according to claim 2, wherein the SGLT2 inhibitor is selected from empagliflozin, canagliflozin, remogliflozin, ipragliflozin, HM41322, and dapagliflozin.

13. The method according to claim 2, wherein the SGLT2 inhibitor is selected from bexagliflozin, ertugliflozin, sotagliflozin, luseogliflozin, and tofogliflozin.

14. The method according to claim 2, wherein the MACE is selected from non-fatal myocardial infarction, cardiovascular death, stroke, and hospitalization for cardiovascular disease events.

15. The method according to claim 14, wherein the MACE is selected from non-fatal myocardial infarction, cardiovascular death, and stroke.

16. The method according to claim 14, wherein the hospitalization for cardiovascular disease events is hospitalization for congestive heart failure.

17. The method according to claim 1, wherein the SGLT2 inhibitor is empagliflozin.

18. The method according to claim 1, wherein the SGLT2 inhibitor is canagliflozin.

19. The method according to claim 1, wherein the SGLT2 inhibitor is dapagliflozin.

20. The method according to claim 2, wherein the SGLT2 inhibitor is empagliflozin.

21. The method according to claim 2, wherein the SGLT2 inhibitor is canagliflozin.

22. The method according to claim 2, wherein the SGLT2 inhibitor is dapagliflozin.

* * * * *